United States Patent
Baba et al.

(10) Patent No.: US 6,725,662 B2
(45) Date of Patent: Apr. 27, 2004

(54) DRIVE DEVICE

(75) Inventors: Tsuyoshi Baba, Wako (JP); Hiroyuki Niikura, Wako (JP); Yasunobu Kawakami, Wako (JP); Hiroyuki Horimura, Wako (JP); Tsuneo Endoh, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/149,065

(22) PCT Filed: Dec. 8, 2000

(86) PCT No.: PCT/JP00/08702
§ 371 (c)(1),
(2), (4) Date: Nov. 14, 2002

(87) PCT Pub. No.: WO01/42625
PCT Pub. Date: Jun. 14, 2001

(65) Prior Publication Data
US 2003/0115877 A1 Jun. 26, 2003

(30) Foreign Application Priority Data
Dec. 8, 1999 (JP) ............................................ 11-348350
Dec. 6, 2000 (JP) ....................................... 2000-371820

(51) Int. Cl.⁷ .............................. F02G 3/00; F02G 5/04; F01K 23/10; F01K 23/06; F16H 37/02
(52) U.S. Cl. ......................................... 60/620; 60/670
(58) Field of Search ..................... 60/604, 618, 620, 60/650, 670, 671, 614, 616

(56) References Cited

U.S. PATENT DOCUMENTS

| | | | | |
|---|---|---|---|---|
| 3,830,062 A | * | 8/1974 | Morgan et al. | 60/618 |
| 4,351,155 A | | 9/1982 | Anderson et al. | 60/618 |
| 4,393,656 A | * | 7/1983 | Anderson et al. | 60/618 |
| 5,896,746 A | * | 4/1999 | Platell | 60/618 |

FOREIGN PATENT DOCUMENTS

| | | |
|---|---|---|
| JP | 56-20707 A | 2/1981 |
| JP | 57-16293 | 1/1982 |
| JP | 57-26357 A | 2/1982 |
| JP | 57-26363 A | 2/1982 |
| JP | 58-48076 | 3/1983 |
| JP | 59-41602 | 3/1984 |
| JP | 59-128907 A | 7/1984 |
| JP | 59-165528 U | 11/1984 |
| JP | 59-221409 A | 12/1984 |
| JP | 60-54703 U | 4/1985 |
| JP | 60-206990 | 10/1985 |
| JP | 60-175801 U | 11/1985 |
| JP | 64-29676 | 1/1989 |
| JP | 7-35846 | 4/1995 |
| JP | 9-53573 A | 2/1997 |
| JP | 9-137732 A | 5/1997 |

* cited by examiner

*Primary Examiner*—Sheldon J. Richter
(74) *Attorney, Agent, or Firm*—Birch, Stewart, Kolasch & Birch, LLP

(57) ABSTRACT

In a drive system, there is provided a waste heat recovering device forming a Rankine cycle by an evaporator for heating water with waste heat of an internal combustion engine to generate high-pressure vapor, the internal combustion engine being connected to a transmission, a displacement-type expander for converting high-pressure vapor generated by the evaporator to an output with constant torque, a condenser for liquefying low-pressure vapor discharged from the expander, and a feed pump for supplying water liquefied by the condenser to the evaporator. The expander is connected to a power generator/motor via a planetary gear mechanism, and the expander is connected to an output shaft of the internal combustion engine via the planetary gear mechanism and a belt-type continuously variable transmission. A change gear ratio of the belt-type continuously variable transmission is controlled such that a rotational speed of the internal combustion engine and a rotational speed of the expander are matched with each other and are transmitted to the transmission. Hence, it is possible to effectively drive the driven portion by using the output of the expander of the waste heat recovering device.

6 Claims, 22 Drawing Sheets

DRIVE DEVICE

This application is the national phase under 35 U.S.C. § 371 of PCT International Application No. PCT/JP00/08702 which has an International filing date of Dec. 8, 2000, which designated the United States of America.

FIELD OF THE INVENTION

The present invention relates to a drive system which is comprised of a waste heat recovering device including a displacement-type expander and a power transmission system for transmitting the output of the expander to a driven portion.

BACKGROUND ART

Japanese Patent Publication No. 7-35846 discloses an exhaust energy recovery apparatus which is comprised of a turbine driven by exhaust gas of an internal combustion engine, a power generator driven by the turbine, a motor driven by power generated by the power generator, and a planetary gear mechanism for combining the shaft output of the motor with the shaft output of the internal combustion engine. According to the exhaust energy recovery apparatus, it is possible to recover a part of energy of exhaust gas that has been conventionally discarded without being effectively used so as to assist the shaft output of the internal combustion engine, thereby contributing to a reduction in consumption of fuel.

It should be noted here that the above conventional device suffers from a problem that kinetic energy of exhaust gas is used to drive the turbine and hence, thermal energy of high-temperature exhaust gas cannot be effectively used, resulting in low efficiency of recovering energy. Thus, it has been considered that exhaust energy is recovered by a Rankine cycle comprised of an evaporator for heating water by using thermal energy of exhaust gas to generate high-pressure vapor, an expander for conversing high-pressure vapor, which is supplied from the evaporator, to shaft output with constant torque, a condenser for liquefying low-pressure vapor discharged from the expander, and a feed pump for supplying water liquefied by the condenser to the evaporator. In this case, a displacement-type expander is adopted, so that it is possible to obtain high efficiency in a wide rotational speed region of the expander, thereby more effectively recovering energy of exhaust gas.

When a displacement-type expander is adopted in an waste heat recovering device of a Rankine cycle type, the shaft output of the expander has time delay relative to the shaft output of the internal combustion engine. In addition, the expander is characterized by shaft output with constant torque and a rotational speed determined by shaft output of the internal combustion engine. Therefore, in order to effectively use the shaft output of the expander, it is necessary to provide a special power transmission system, which is suitable for the above described characteristics, between the expander and a driven portion driven by the expander.

DISCLOSURE OF THE INVENTION

The present invention is achieved in view of the above described circumstances and an object thereof is to effectively drive a driven portion by using an output of an expander of a waste heat recovering device forming a Rankine cycle.

In order to attain the above object, according to the present invention, there is provided a drive system which comprises a waste heat recovering device forming a Rankine cycle by an evaporator for heating a working medium with a waste heat of a prime mover to generate a high-pressure vapor, a displacement-type expander for converting high-pressure vapor generated by the evaporator to output with constant torque, a condenser for liquefying low-pressure vapor discharged from the expander, and a pump for supplying a working medium liquefied by the condenser to the evaporator; and a power transmission system for transmitting the output of the expander to a driven portion, the power transmission system driving the driven portion according to the output characteristics of the expander.

With the above arrangement, regarding the expander of the Rankine cycle using a waste heat of the prime mover as a heat source, the output characteristics include time delay relative to the output of the prime mover, and changes in rotational speed with constant torque relative to changes in output of the prime mover. The power transmission system disposed between the expander and the driven portion drives the driven portion according to the above output characteristics of the expander, so that the output of the expander can be effectively used.

Further, in addition to the above arrangement, there is provided a drive system, wherein the power transmission system drives the driven portion within a range of the output characteristics of the expander.

With the above arrangement, since the power transmission system drives the driven portion within a range of the output characteristics of the expander, it is possible to prevent the expander from operating beyond the range of the output characteristics and reducing efficiency.

Moreover, in addition to the above arrangement, there is provided a drive system, wherein the power transmission system can distribute the output of the expander to a plurality of driven portions in an arbitrary ratio.

With the above arrangement, since the power transmission system distributes the output of the expander to a plurality of driven portions in an arbitrary ratio, the output of the expander can be applied for a variety of uses to enhance general-purpose utility.

Moreover, in addition to the above arrangement, there is provided a drive system, wherein the power transmission system comprises at least a planetary gear mechanism.

With the above arrangement, since the power transmission system comprises the planetary gear mechanism, the output of the expander can be properly distributed to a plurality of driven portions.

Besides, an internal combustion engine 1 of an embodiment corresponds to the prime mover of the present invention, and a power generator/motor 124 and a transmission 143 correspond to the driven portions of the present invention.

BRIEF DESCRIPTION OF THE DRAWINGS

FIGS. 1 to 24 show an example of the present invention, wherein FIG. 1 is a diagram showing an overall configuration of a drive system; FIG. 2 is a diagram showing a structure of a driving force transmission system; FIG. 3 is a diagram for explaining matching of a shaft output of an internal combustion engine and the shaft output of an expander; FIG. 4 are graphs showing a relationship between a rotational speed and shaft output of the internal combustion engine and a relationship between a rotational speed and shaft output of the expander; FIG. 5 is a graph showing a relationship between a rotational speed of the internal combustion engine and a rotational speed of the expander; FIG. 6 is a graph showing changes with time in rotational speed of the internal combustion engine, rotational speed of the expander, and change gear ratio of a belt-type continuously variable transmission; FIG. 7 is a velocity diagram of a planetary gear mechanism at a start of the internal combustion engine; FIG. 8 is a velocity diagram of the planetary gear mechanism when the expander is not operated after the internal combustion engine is started; FIG. 9 is a velocity diagram of the planetary gear mechanism at the start of the expander; FIG. 10 is a velocity diagram of the planetary gear mechanism during steady state driving; FIG. 11 is a velocity diagram of the planetary gear mechanism during acceleration of the internal combustion engine; FIG. 12 is a velocity diagram of the planetary gear mechanism during deceleration of the internal combustion engine; FIG. 13 is a diagram for explaining the operation of the planetary gear mechanism when climbing load is applied; FIG. 14 is a velocity diagram of the planetary gear mechanism when the expander is started by a power generator/motor; FIG. 15 is a longitudinal section showing the expander (sectional view taken along a line 15—15 in FIG. 18); FIG. 16 is an enlarged sectional view showing a neighborhood of a rotation shaft of FIG. 15; FIG. 17 is a sectional view taken along a line 17—17 in FIG. 15; FIG. 18 is a sectional view taken along a line 18—18 in FIG. 15 with an enlarged essential portion; FIG. 19 is an explanatory drawing showing a section of a rotor chamber and a rotor; FIG. 20 is a front view showing a vane body; FIG. 21 is a side view showing the vane body; FIG. 22 is a sectional view taken along a line 22—22 in FIG. 20; FIG. 23 is a front view showing a seal member; and FIG. 24 is an enlarged view showing a neighborhood of the rotation shaft of FIG. 17.

BEST MODE FOR CARRYING OUT THE INVENTION

The mode for carrying out the present invention will now be described by way of an embodiment with reference to the accompanying drawings.

FIGS. 1 to 24 show an embodiment of the present invention.

Figure 1:
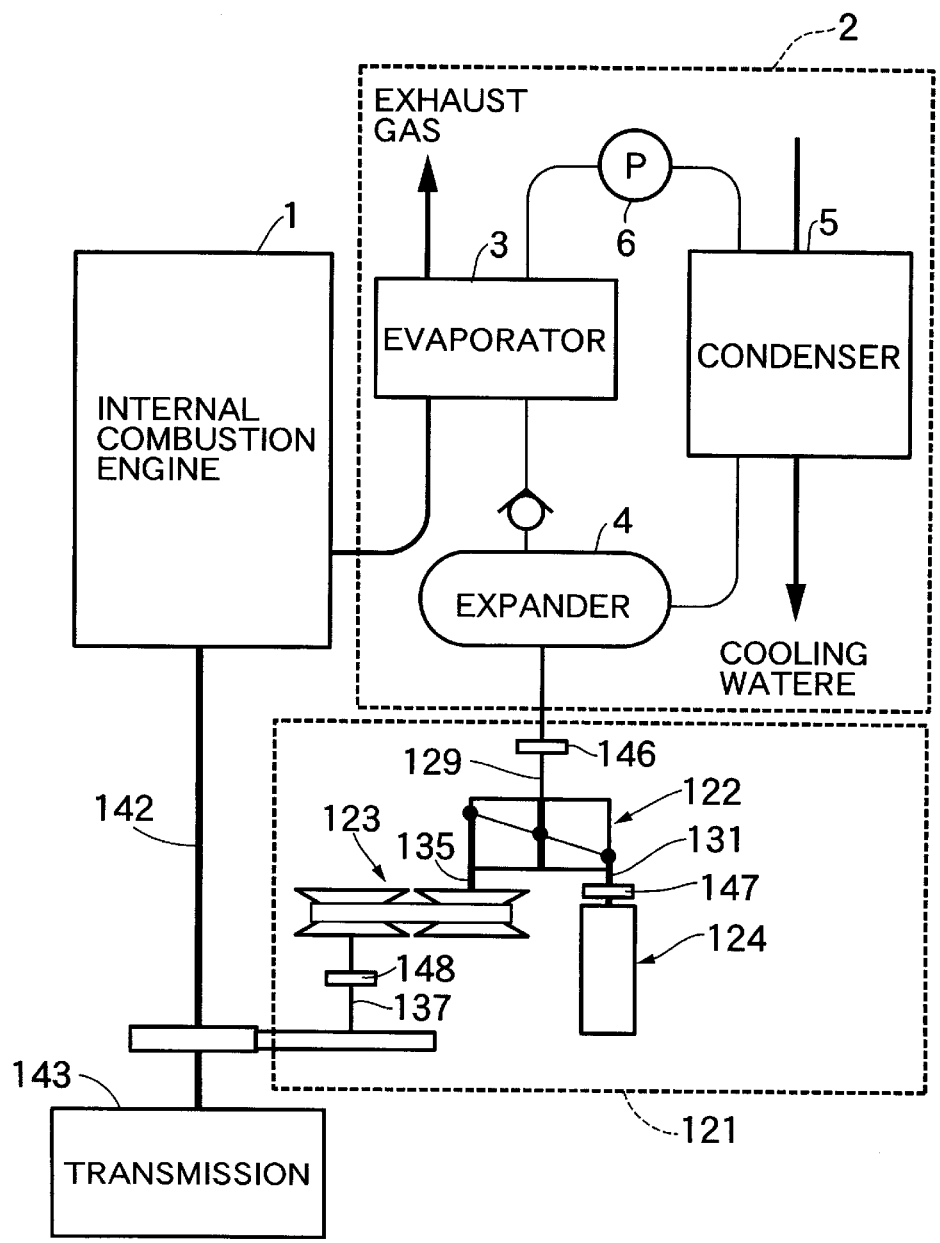

In FIG. 1, a waste heat recovering device 2 of an internal combustion engine 1 as a prime mover installed in an automobile, has an evaporator 3 for generating a vapor with raised temperature and pressure, that is, high-pressure vapor by using waste heat such as exhaust gas of the internal combustion engine 1 as a heat source, an expander 4 for generating shaft output by expanding the high-pressure vapor, a condenser 5 for liquefying vapor which is discharged from the expander 4 with a dropped temperature and pressure after the expansion, that is, for liquefying low-pressure vapor, and a feed pump 6 for supplying liquefied working medium such as water from the condenser 5 to the evaporator 3. A displacement-type expander with constant output torque is used as the expander 4. The displacement-type expander 4 has excellent efficiency at all rotational speeds, and the rotational speed is determined by a quantity of vapor generated by the evaporator 3. A variety of structures are available for the displacement-type expander 4, and a vane-type expander 4 is adopted in the present embodiment. The structure of the vane-type expander 4 will be specifically discussed later.

Figure 2:
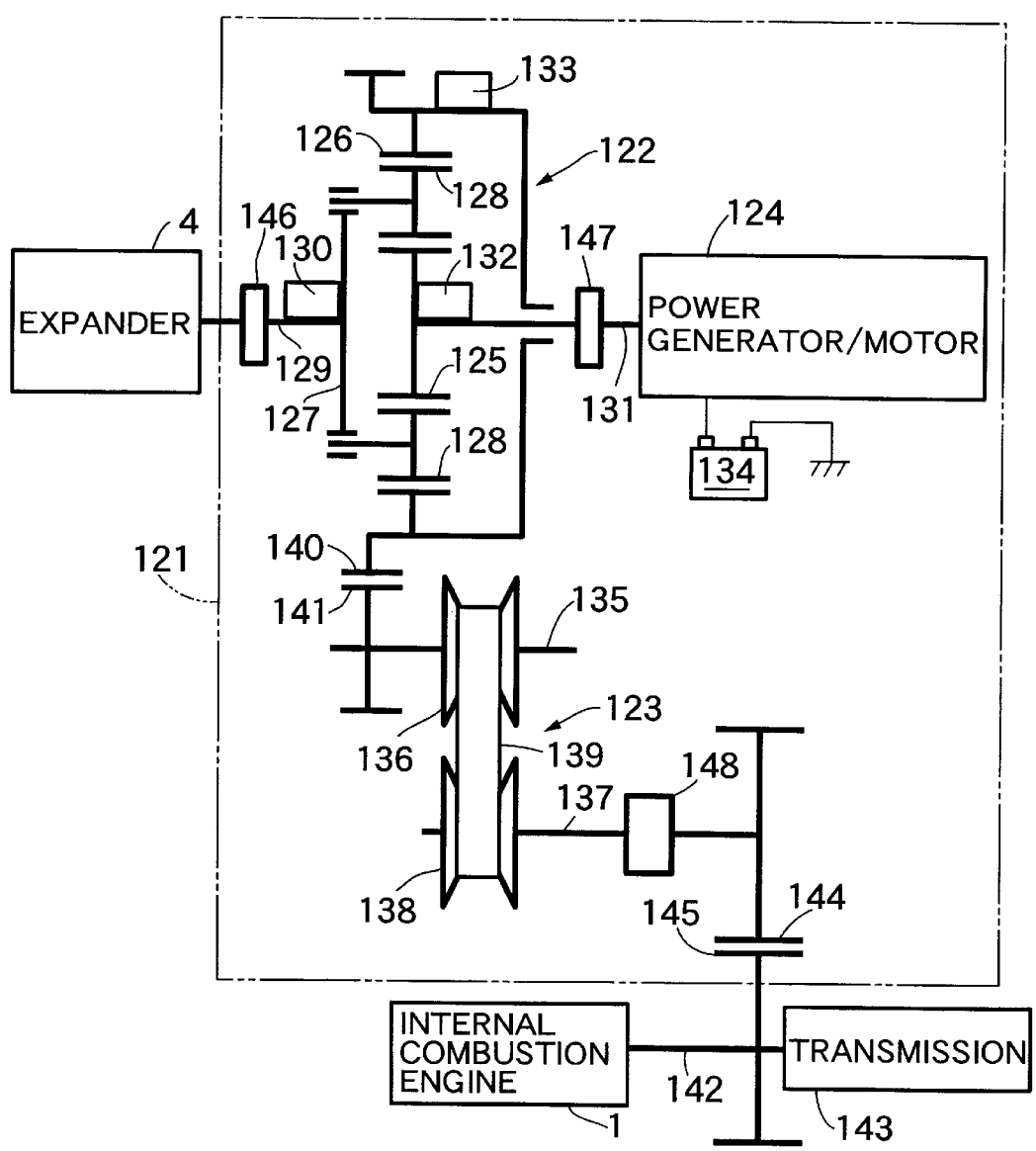

As is apparent from FIG. 2 at the time of simultaneously referring to FIG. 2, a power transmission system 121 connected to the waste heat recovering device 2 comprises a planetary gear mechanism 122, a belt-type continuously variable transmission 123, and a power generator/motor 124, which forms a driven portion of the present invention.

The planetary gear mechanism 122 comprises a sun gear 125, a ring gear 126, a planetary carrier 127, and a plurality of planetary gears 128 which are supported on the shaft of the planetary carrier 127 and are engaged simultaneously with the sun gear 125 and the ring gear 126. The planetary carrier 127 connected to an output shaft 129 of the expander 4 can be engaged with a casing (not shown) by a carrier brake 130. The sun gear 125 connected to an input/output shaft 131 of the power generator/motor 124 can be engaged with a casing (not shown) by a sun gear brake 132. The ring gear 126 can be engaged with a casing (not shown) by a ring gear brake 133. The carrier brake 130, the sun gear brake 132, and the ring gear brake 133 are each formed by a hydraulic brake or an electromagnetic brake.

The power generator/motor 124 is connected to a battery 134 which can be charged and discharged. The power generator/motor 124 charges the battery 134 when the power generator/motor 124 is driven by the shaft output of the expander 4 or the internal combustion engine 1 to function as a power generator, and the power generator/motor 124 assists a driven wheel driven by the internal combustion engine 1 or starts the internal combustion engine 1 when the power generator/motor 124 is fed from the battery 134 to function as a motor.

The belt-type continuously variable transmission 123 comprises a drive pulley 136 provided on an input shaft 135, a follower pulley 138 provided on an output shaft 137, and an endless belt 139 wound around the pulleys 136 and 138. The drive pulley 136 and the follower pulley 138 are each varied in groove width by hydraulic control or electric control. When the drive pulley 136 is increased in groove width and the follower pulley 138 is reduced in groove width, a change gear ratio varies to the LOW side continuously or in a stepless manner, and when the drive pulley 136 is reduced in groove width and the follower pulley 138 is increased in groove width, a change gear ratio varies to the TOP side continuously.

A drive gear 140 provided on the ring gear 126 of the planetary gear mechanism 122 is engaged with a driven gear 141 provided on the input shaft 135 of the belt-type continuously variable transmission 123. The shaft output of the internal combustion engine 1 is transmitted to a transmission 143, which forms a driven portion of the present invention, via an output shaft 142, and the output of the transmission 143 is transmitted to a driven wheel (not shown). A drive gear 144 provided on the output shaft 137 of the belt-type continuously variable transmission 123 is engaged with a driven gear 145 provided on the output shaft 142 of the internal combustion engine 1.

Torque limiters 146 and 147 are provided respectively on the output shaft 129 of the expander 4 and the input/output shaft 131 of the power generator/motor 124. The torque limiters 146 and 147 slip when torque of a predetermined value or more is applied to the expander 4 or the power generator/motor 124, thereby preventing the occurrence of overload. The torque limiters 146 and 147 can be replaced with clutches which are disengaged in the event of torque causing overload of a predetermined value or more. A clutch 148 is provided on the output shaft 137 of the belt-type continuously variable transmission 123. The clutch 148 is provided to prevent driving force, which is inversely transmitted from the internal combustion engine 1 or the driven wheel, from causing overload applied to the expander 4. The clutch 148 connects the internal combustion engine 1 and the expander 4 upon engagement and disconnects the internal combustion engine 1 and the expander 4 upon disengagement.

Thus, when the sun gear brake 132 of the planetary gear mechanism 122 is engaged to fix the sun gear 125, the planetary carrier 127 and the ring gear 126 each serve as an input element or an output element, driving force input from the expander 4 to the planetary carrier 127 is output to the ring gear 126, and the driving force is transmitted therefrom to the output shaft 142 of the internal combustion engine 1 via the drive gear 140, the driven gear 141, the belt-type continuously variable transmission 123, the drive gear 144, and the driven gear 145. Hence, the shaft output of the expander 4 can assist the shaft output of the internal combustion engine 1. Meanwhile, in the case where the driving force is transmitted in reverse paths when the expander 4 is started, the expander 4 can be smoothly started with the shaft output of the internal combustion engine 1.

Further, when the ring gear brake 133 of the planetary gear mechanism 122 is engaged to fix the ring gear 126, the expander 4 or the power generator/motor 124 respectively serve as an input element and an output element, driving force input to the planetary carrier 127 from the expander 4 is output to the power generator/motor 124 via the sun gear 125, and the power generator/motor 124 is caused to function as a power generator to charge the battery 134. Meanwhile, in the case where the driving force is transmitted in reverse paths when the expander 4 is started, the expander 4 can be smoothly started with shaft output of the power generator/motor 124 serving as a motor.

Moreover, when the carrier brake 130 of the planetary gear mechanism 122 is engaged to fix the planetary carrier 127, the sun gear 125 and the ring gear 126 each serve as an input element or an output element. Therefore, driving force input to the sun gear 125 from the power generator/motor 124, which functions as a motor, is output to the ring gear 126, and the driving force is transmitted therefrom to the output shaft 142 of the internal combustion engine 1 via the drive gear 140, the driven gear 141, the belt-type continuously variable transmission 123, the drive gear 144, and the driven gear 145 so as to assist the shaft output of the internal combustion engine 1 and start the internal combustion engine 1. Meanwhile, the shaft output of the internal combustion engine 1 can be transmitted to the power generator/motor 124 in reverse paths so as to cause the power generator/motor 124 to function as a power generator for charging the battery 134.

Figure 3:
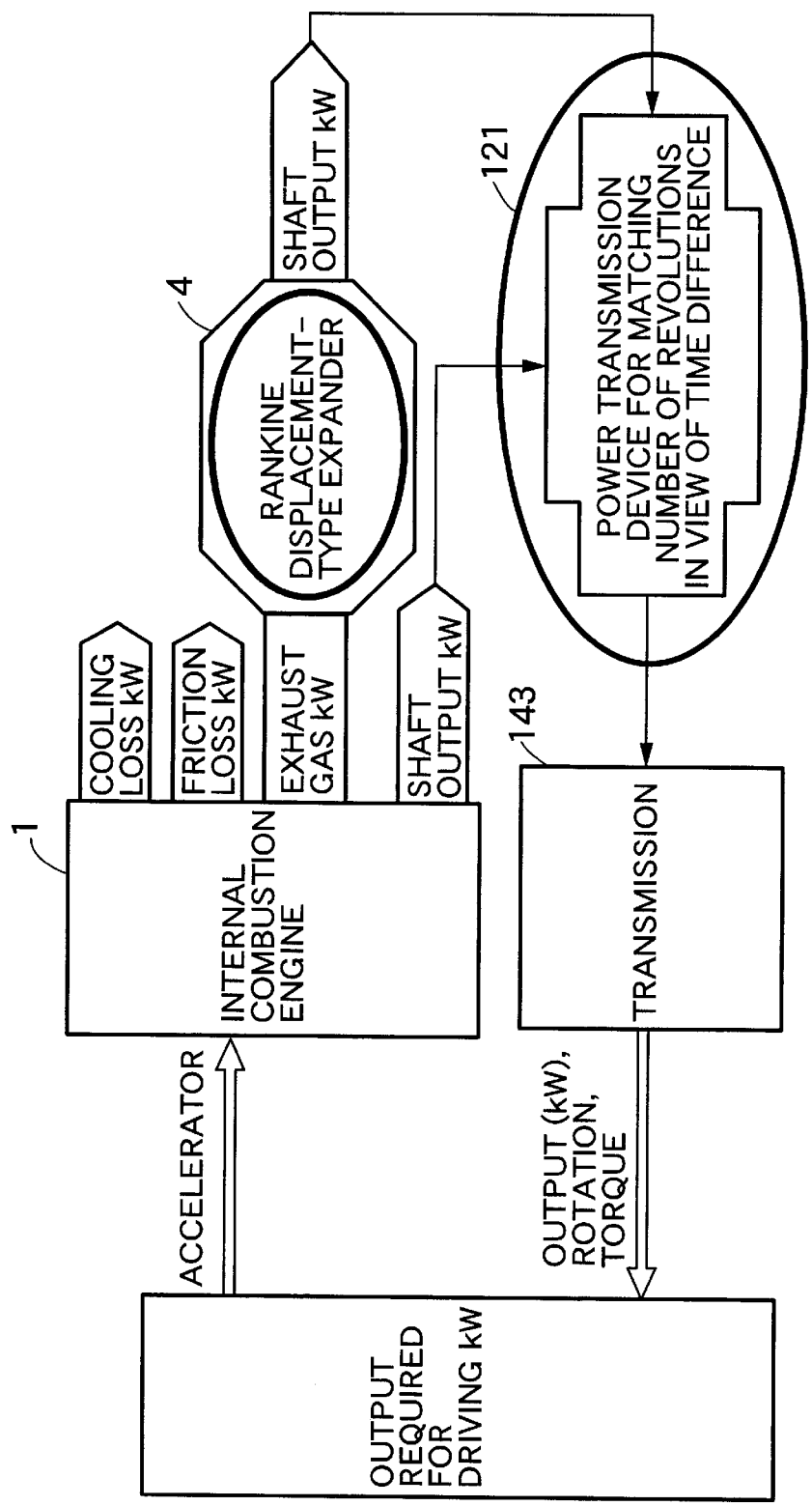

Next, referring to FIG. 3, the following will schematically discuss the functions of the waste heat recovering device 2 and the power transmission system 121.

When a driver operates an accelerator pedal in response to requirement output necessary for driving of an automobile, the internal combustion engine 1 is operated, and thermal energy generated by the combustion of fuel is partially converted to mechanical energy and is supplied to the transmission 143 as an output shaft. In an ordinary internal combustion engine, the rest of thermal energy generated by the combustion of fuel is lost as thermal energy of cooling loss, friction loss, and exhaust gas without being effectively used. In the present invention, the thermal energy of exhaust gas is converted to mechanical energy by the expander 4 of the waste heat recovering device 2. And then, the shaft output of the internal combustion engine 1 and the shaft output of the expander 4 are combined in the power transmission system 121 and are output to the transmission 143. Thus, thermal energy of exhaust gas that has not been conventionally used in an effective manner can be effectively recovered, thereby contributing to a reduction in consumption of fuel.

It should be noted here that the shaft output of the internal combustion engine 1 quickly responds to the operation of the accelerator pedal. Meanwhile, although thermal energy of exhaust gas discharged from the internal combustion engine 1 quickly varies according to an operating condition of the internal combustion engine 1, the generation of high-pressure vapor in the evaporator 3 has a time lag, resulting in a time lag between the shaft output of the expander 4 operated by the high-pressure vapor and the shaft output of the internal combustion engine 1. Additionally, the expander 4 has a relatively narrow range of rotational speeds while the internal combustion engine 1 has a relatively wide range of rotational speeds. Therefore, when the shaft output of the internal combustion engine 1 is assisted by the shaft output of the expander 4, in the power transmission system 121, it is necessary to absorb delay in response in change in rotational speed of the expander 4 relative to a rapid increase or decrease in rotational speed of the internal combustion engine 1, to absorb a difference in range of rotational speeds between the internal combustion engine 1 and the expander 4, and to properly match the rotational speed of the internal combustion engine 1 and the rotational speed of the expander 4 to effectively drive the transmission 143. For this reason, an output rotational speed of the expander 4 is variably controlled by the planetary gear mechanism 122 and the belt-type continuously variable transmission 123 that are placed between the expander 4 and the transmission 143.

Further, by fixing one of three elements of the planetary gear mechanism 122, that is, one of the sun gear 125, the ring gear 126, and the planetary carrier 127, the transmission of driving force can be switched among the expander 4, the power generator/motor 124, and the belt-type continuously variable transmission 123 (that is, the internal combustion engine 1), so that the expander 4, the power generator/motor 124, and the internal combustion engine 1 can be effectively used for many purposes.

Figure 4:
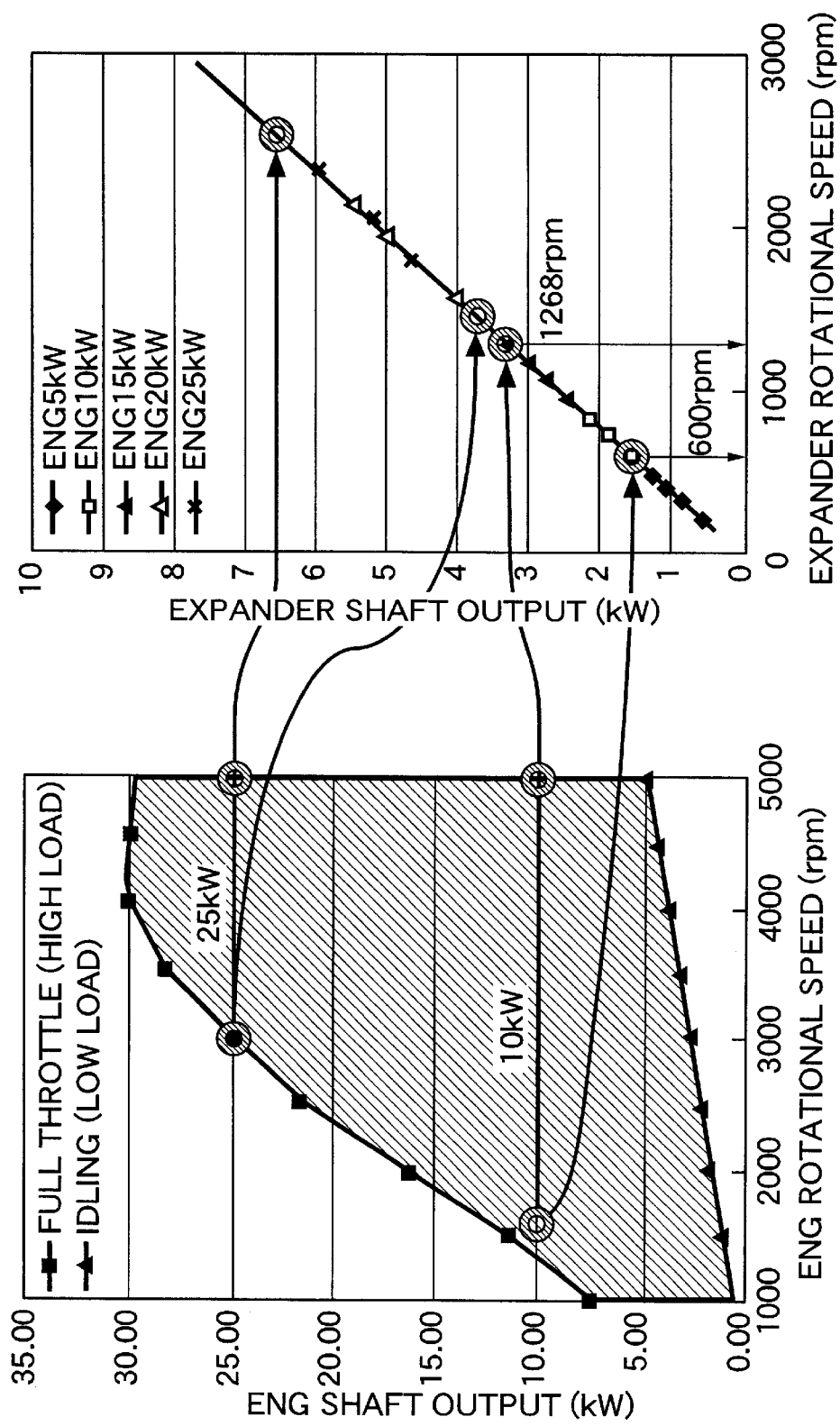

FIG. 4 shows comparison between the output characteristics of the internal combustion engine 1 and the output characteristics of the expander 4. Since a torque of the internal combustion engine 1 is variable, any shaft output can be obtained between an upper limit value (during full throttle) and a lower limit value (during idling) at any rotational speed (see a diagonally shaded area of the left graph). For example, when the internal combustion engine 1 has a rotational speed of 1500 rpm, the lower limit value of shaft output is 1 kW and the upper limit value is 11 kW. Conversely, from the shaft output side of the internal combustion engine 1, when the shaft output is 10 kW, a rotational speed starts from 1300 rpm and reaches 5000 rpm, which is a level limit. At this point, even when the internal combustion engine 1 has a constant shaft output of 10 kW, since the rotational speed is varied, a temperature of exhaust gas rises with higher rotational speed. Hence, a quantity of vapor supplied from the evaporator 3 to the expander 4 also increases.

The right graph of FIG. 4 shows a plot of a rotational speed and shaft output of the expander 4 in accordance with various operating conditions (rotational speed and shaft output) of the internal combustion engine 1. For example, when the internal combustion engine 1 has a rotational speed of 1500 rpm and shaft output of 10 kW, the expander 4 has a rotational speed of 600 rpm and shaft output of 1.5 kW. Moreover, when the internal combustion engine 1 has a rotational speed of 5000 rpm and shaft output of 10 kW, the expander 4 has a rotational speed of 1268 rpm and shaft output of 3.2 kW. In this way, when the operating conditions of the internal combustion engine 1 are varied, the rotational speed and shaft output of the expander 4 change substantially along a straight line with a directly proportional relation.

The reason for the directly proportional relation between a rotational speed and shaft output of the expander 4 is that the displacement-type expander 4 has constant torque and only a rotational speed thereof is changed according to an operating condition of the internal combustion engine 1. Namely, when a temperature of exhaust gas is changed according to an operating condition of the internal combustion engine 1, an amount of vapor generated in the evaporator 3 is changed, and a rotational speed of the expander 4 is changed according to the amount of the generated vapor. Meanwhile, since the expander 4 has torque of a fixed value, the shaft output of the expander 4, which is given as the product of a torque having a fixed value and a rotation speed having a variable value, is directly proportional to a rotational speed.

Figure 5:
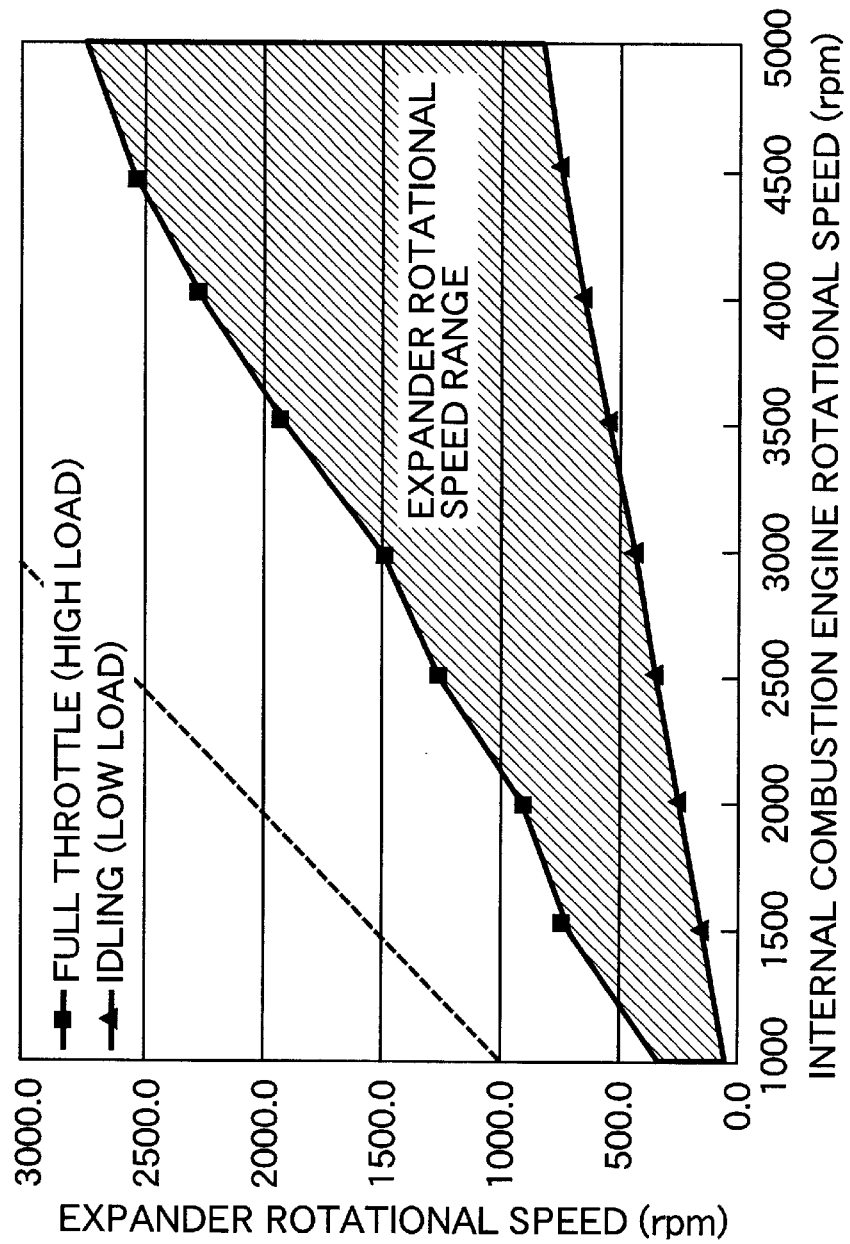

FIG. 5 shows a plot of a relationship between a rotational speed of the internal combustion engine 1 and a rotational speed of the expander 4. The relationship is determined based on the left graph and the right graph of FIG. 4. For example, when the internal combustion engine 1 has a rotational speed of 3000 rpm, the expander 4 has a rotational speed of 430 to 1500 rpm. This is because when the internal combustion engine 1 has a constant rotational speed but is varied in shaft output, a temperature of exhaust gas is varied to change an amount of vapor generated. Thus, a rotational speed of the expander 4 increases or decreases accordingly.

As described above, it is found that a rotational speed of the expander 4 and a rotational speed of the internal combustion engine 1 do not have a one—one relation, and the rotational speed of the expander 4 has a predetermined region of rotational speeds at each rotational speed of the internal combustion engine 1 (see a diagonally shaded area of FIG. 5). A broken line in FIG. 5 shows matching between a rotational speed of the expander 4 and a rotational speed of the internal combustion engine 1. The above described region is positioned on the lower right of the broken line, and a rotational speed of the expander 4 is always lower than that of the internal combustion engine 1. Therefore, in order to assist the shaft output of the internal combustion engine 1 with the shaft output of the expander 4, it is necessary to increase a rotational speed of the expander 4 by the planetary gear mechanism 122 and the belt-type continuously variable transmission 123 of the power transmission system 121 and to match the rotational speed with that of the internal combustion engine.

Figure 6:
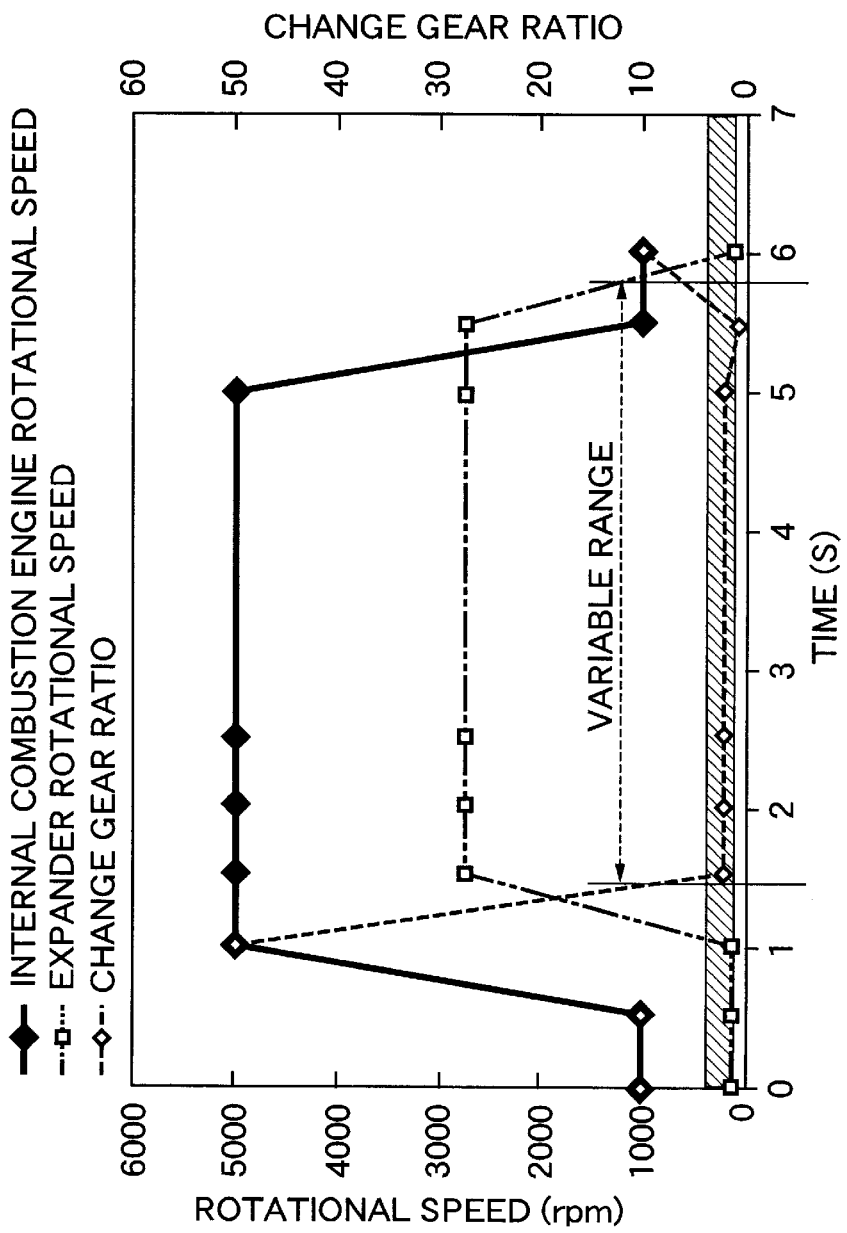

In FIG. 6, as indicated by a solid line, it is assumed that a rotational speed of the internal combustion engine 1 increases from 1000 to 5000 rpm, and then, the rotational speed decreases to 1000 rpm again. Accordingly, as indicated by a chain line, a rotational speed of the expander 4 increases from 150 to 2750 rpm, and then, the rotational speed decreases to 150 rpm again. And then, a time delay of about 0.5 s occurs between the rising of the rotational speed of the internal combustion engine 1 and the rising of the rotational speed of the expander 4, and a time delay of about 0.5 s occurs between the falling of the rotational speed of the internal combustion engine 1 and the falling of the rotational speed of the expander 4.

A broken line of FIG. 6 indicates a change gear ratio of the belt-type continuously variable transmission 123 required for matching a rotational speed of the internal combustion engine 1 and a rotational speed of the expansion machine 4. When a rotational speed of the internal combustion engine 1 rises, a rotational speed of the expander 4 does not quickly rise due to a time delay. Thus, a change gear ratio of the belt-type continuously variable transmission 123 reaches 50 in a moment. Further, when the rotational speed of the internal combustion engine 1 falls as well, the gear change ratio of the belt-type continuously variable transmission reaches 10 in a moment because of the above time delay.

However, when a rotational speed of the internal combustion engine 1 is stable, a change gear ratio required for matching a rotational speed of the internal combustion engine 1 and a rotational speed of the expander 4 is within a range of available gear change ratios (e.g., 0.5 to 2.5) of the belt-type continuously variable transmission 123. The available gear change ratios are indicated by a diagonally shaded area. Therefore, except for rapid acceleration and rapid deceleration of the internal combustion engine 1, it is possible to match a rotational speed of the internal combustion engine 1 and a rotational speed of the expander 4 by controlling a change gear ratio of the belt-type continuously variable transmission 123.

Additionally, a change gear ratio computed by a rotational speed of the internal combustion engine 1 (indicated by a solid line) and a rotational speed of the expander 4 (indicated by a chain line) does not conform to the change gear ratio indicated by the broken line. This is because a change gear ratio of the overall power transmission system 121 is not only determined by a change gear ratio of the belt-type continuously variable transmission 123 but also changed by a change gear ratio of the planetary gear mechanism 122.

In this way, when the above described matching cannot be made by controlling a change gear ratio of the belt-type continuously variable transmission 123 due to delay in response of a rotational speed of the expander 4, the torque limiter 146 placed on the output shaft 129 of the expander 4 is slipped or the clutch 148 placed on the output shaft 137 of the belt-type continuously variable transmission 13 is disengaged so as to prevent overload from being applied on the expander 4.

Next, referring to FIGS. 7 to 12, the control of the planetary gear mechanism 122 will be discussed below. In these drawings, reference character S denotes a rotational speed of the sun gear 125 of the planetary gear mechanism 122 (that is, a rotational speed of the input/output shaft 131 of the power generator/motor 124), reference character C denotes a rotational speed of the planetary carrier 127 (that is, a rotational speed of the output shaft 129 of the expander 4), and reference character R denotes a rotational speed of the ring gear 126 (that is, a rotational speed of the input shaft 135 of the belt-type continuously variable transmission 123).

Figure 7:
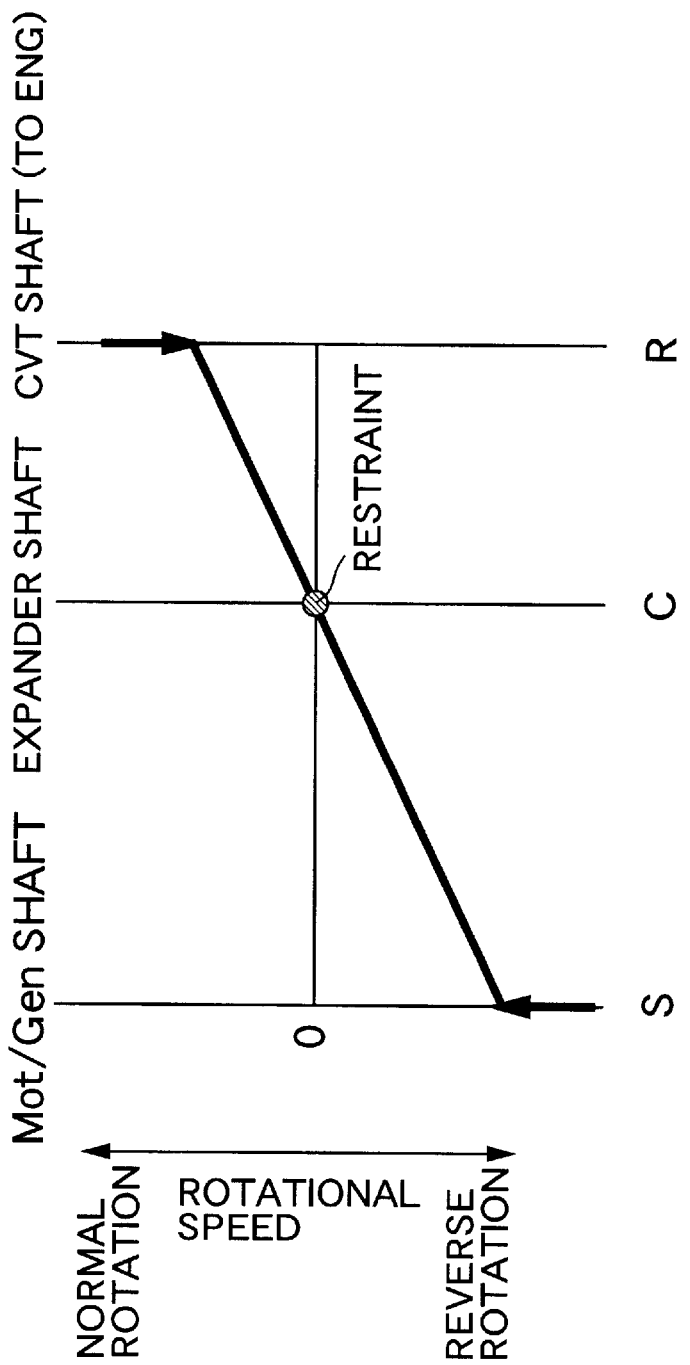

FIG. 7 shows a startup of the internal combustion engine 1. The power generator/motor 124 is caused to function as a motor to drive the sun gear 125 of the planetary gear mechanism 122 in a state in which the carrier brake 130 is engaged to restrain the rotation of the output shaft 129 of the expander 4. At this point, since the planetary carrier 127 is restrained by the carrier brake 130, the ring gear 126 is rotated to drive the input shaft 135 of the belt-type continuously variable transmission 123, and the output axis 142 of the internal combustion engine 1 is driven. The output shaft 142 is connected to the output shaft 137 of the belt-type continuously variable transmission 123. As a result, the internal combustion engine 1 is cranked and started by the output shaft 142. In this way, it is possible to eliminate the necessity for a special cell motor by using the power generator/motor 124 as a cell motor for starting the internal combustion engine 1.

Figure 8:
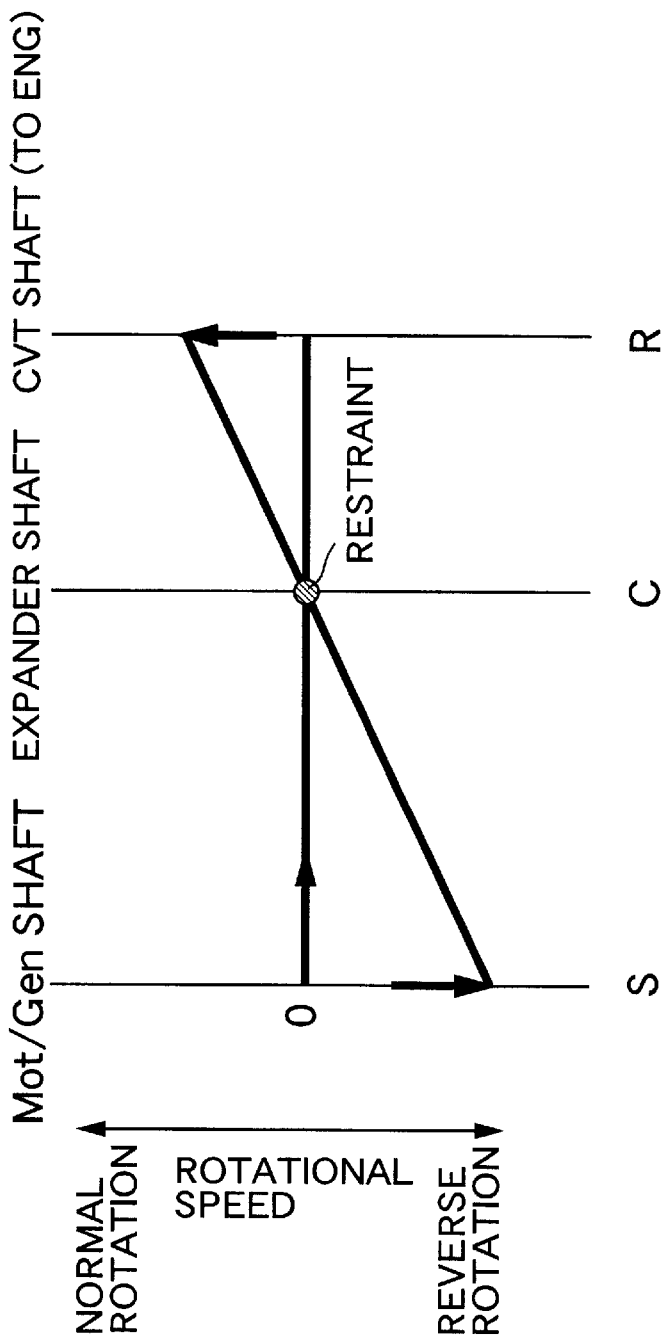

FIG. 8 shows a state in which the evaporator 3 does not generate vapor and the expander 4 is not operated after the startup of the internal combustion engine 1. The clutch 148 of the output shaft 137 of the belt-type continuously variable transmission 123 is disengaged, so that a vehicle can be traveled by the shaft output of the internal combustion engine 1. Further, when the vehicle is not traveled, the clutch 148 is maintained in an engaging state, so that the shaft output of the internal combustion engine 1 is transmitted to the power generator/motor 124 via the belt-type continuously variable transmission 123, and the power generator/motor 124 is caused to function as a power generator so as to charge the battery 134.

Besides, a non-operating state of the expander 4 is not limited to the startup but also includes a shift from an operating state to a suspending state.

Figure 9:
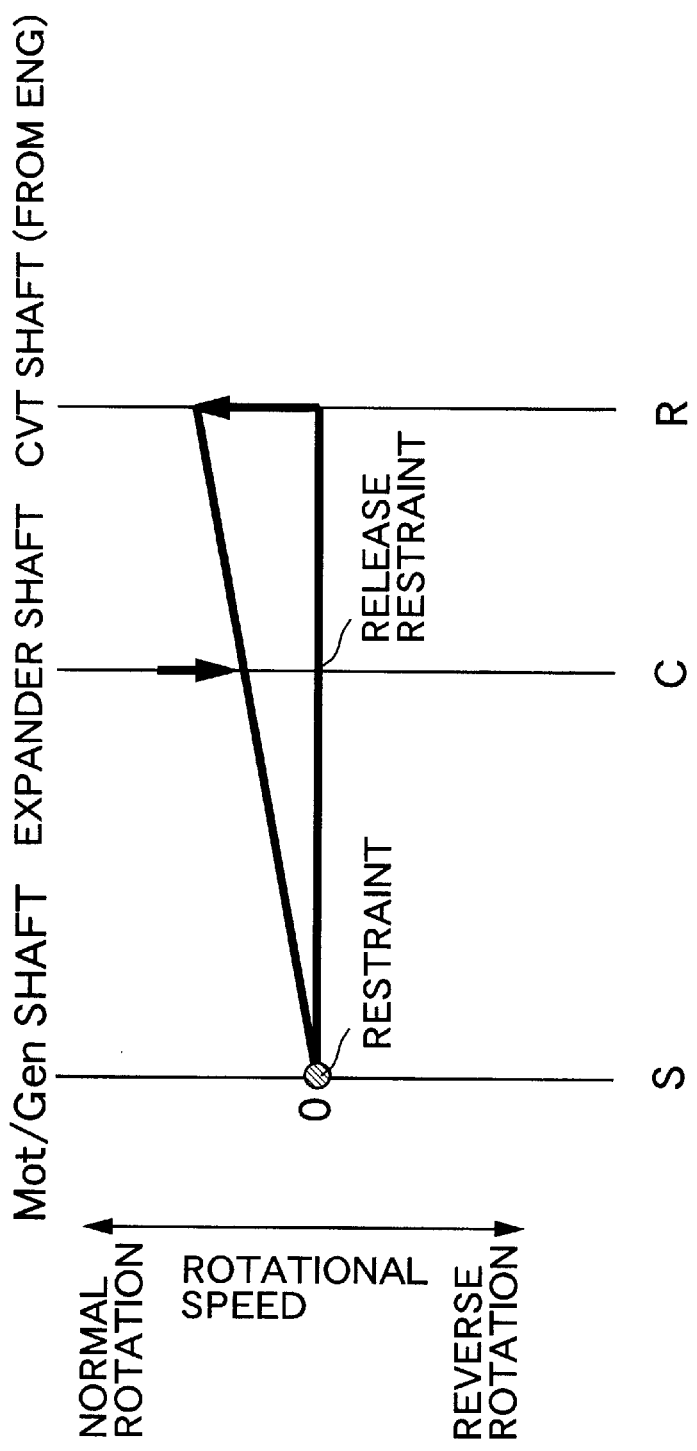

FIG. 9 shows a state in which a predetermined time passes after the startup of the internal combustion engine 1, and the evaporator 3 can generate vapor. In order to smoothly start the expander 4, the output shaft 129 thereof needs to be driven from the outside. For such driving, regardless of whether a vehicle is traveled or not, the sun gear brake 132 is engaged to restrain the rotation of the input/output shaft 131 of the power generator/motor 124, and the clutch 148 of the output shaft 137 of the belt-type continuously variable transmission 123 is engaged. Thus, the shaft output of the internal combustion engine 1 is inversely transmitted to the expander 4 via the belt-type continuously variable transmission 123 and the planetary gear mechanism 122, thereby smoothly starting the expander 4. Additionally, instead of starting the expander 4 with shaft output of the internal combustion engine 1, the following operation is also applicable: the clutch 148 of the output shaft 137 of the belt-type continuously variable transmission 123 is disengaged and the ring gear brake 133 is engaged to restrain the rotation of the input shaft 135 of the belt-type continuously variable transmission 123, and in this state, the power generator/motor 124 is caused to function as a motor and rotate the expander 4 so as to start the expander 4.

As described above, in the case where the expander 4 is cranked and started by causing the power generator/motor 124 to function as a motor, even when the expander 4 is in a state before warming up and condensate generated by condensing vapor builds up in the expander 4, the condensate can be discharged to the outside of the expander 4 by cranking.

Figure 14:
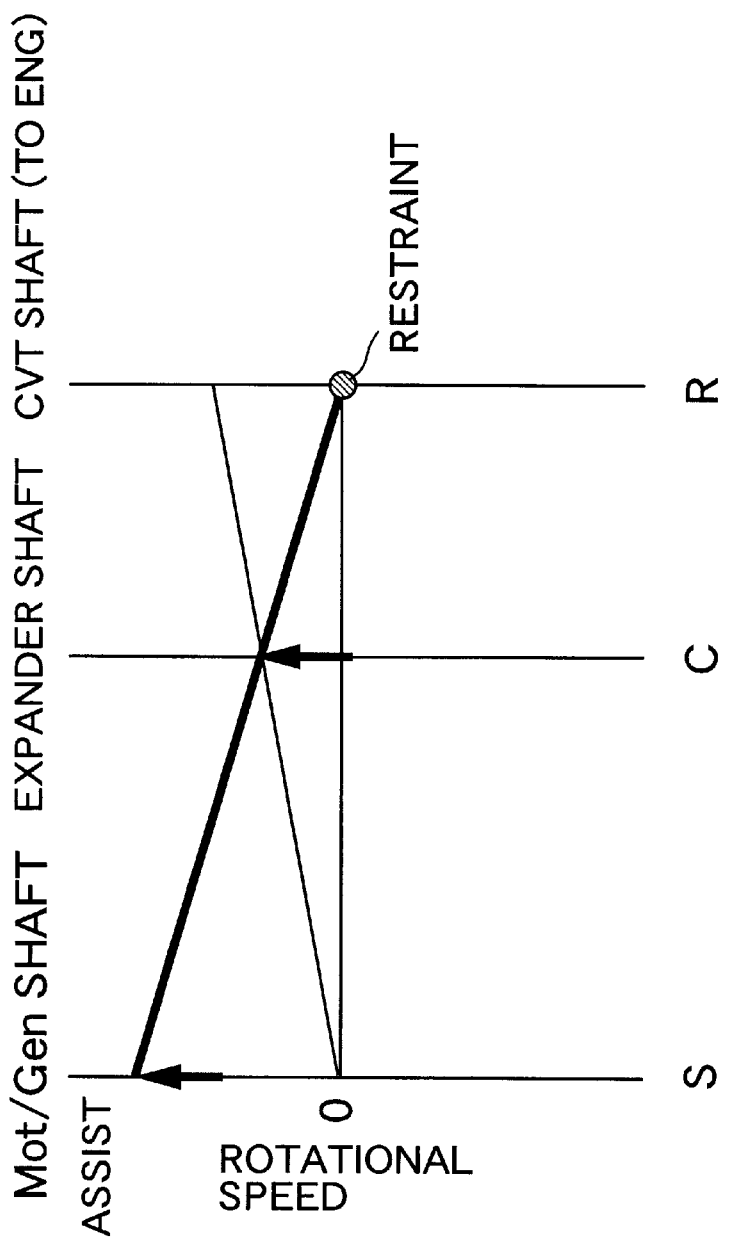

FIG. 14 shows the case where the power generator/motor 124 is caused to function as a motor to crank the expander 4. In this case, the expander 4 can be started by rotating the power generator/motor 124 in a state in which the output shaft 137 of the belt-type continuously variable transmission 123 is fixed. Even when condensate builds up in the expander 4 at a low temperature, the condensate is discharged to the outside of the expander 4 by cranking. Hence, it is possible to prevent the expander 4 from being rotated in an opposite direction upon startup.

Figure 10:
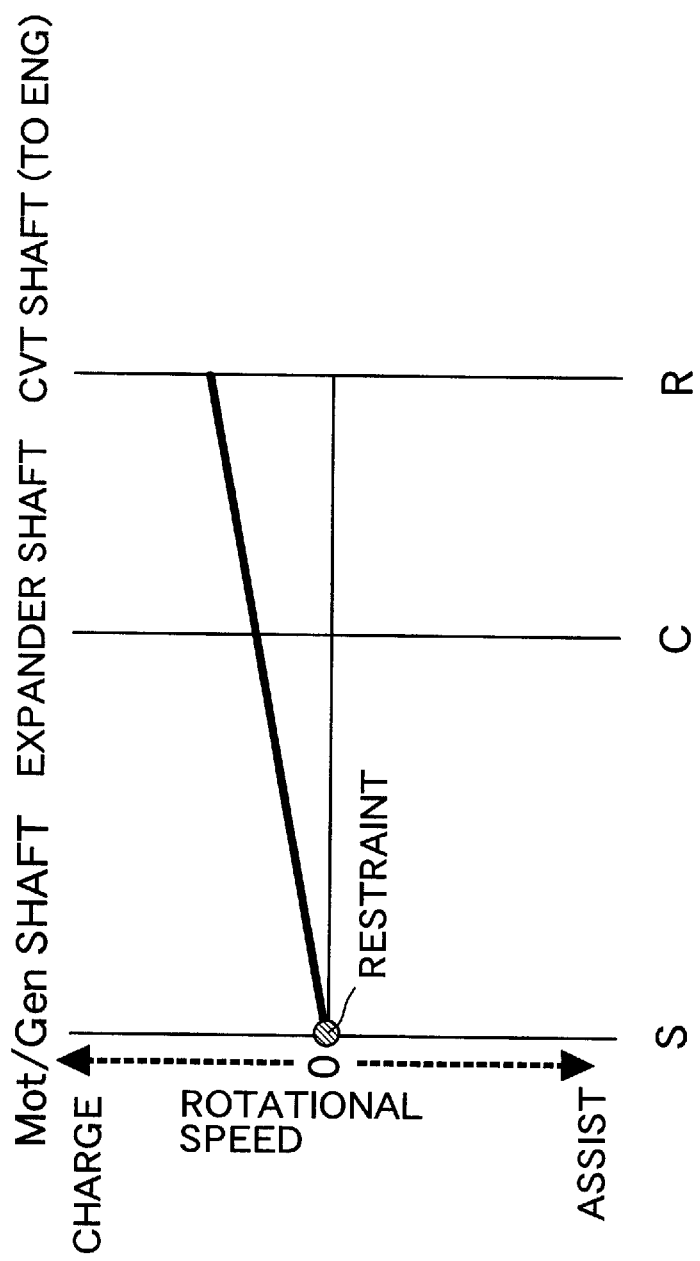

FIG. 10 shows the case where the shaft output of the internal combustion engine 1 is assisted by the shaft output of the expander 4 in steady-state traveling of the vehicle. In this case, like FIG. 9, the sun gear brake 132 is engaged to restrain the rotation of the input/output shaft 131 of the power generator/motor 124, and the clutch 148 on the output shaft 137 of the belt-type continuously variable transmission 123 is engaged. Thus, the output shaft 129 of the expander 4 is connected to the output shaft 142 of the internal combustion engine 1 via the planetary gear mechanism 122 and the belt-type continuously variable transmission 123, and a change gear ratio of the belt-type continuously variable transmission 123 is controlled to match a rotational speed, which is transmitted to the output shaft 142 of the internal combustion engine 1 from the expander 4, with a rotational speed of the internal combustion engine 1, so that the shaft output of the internal combustion engine 1 can be assisted by the shaft output of the expander 4.

Figure 11:
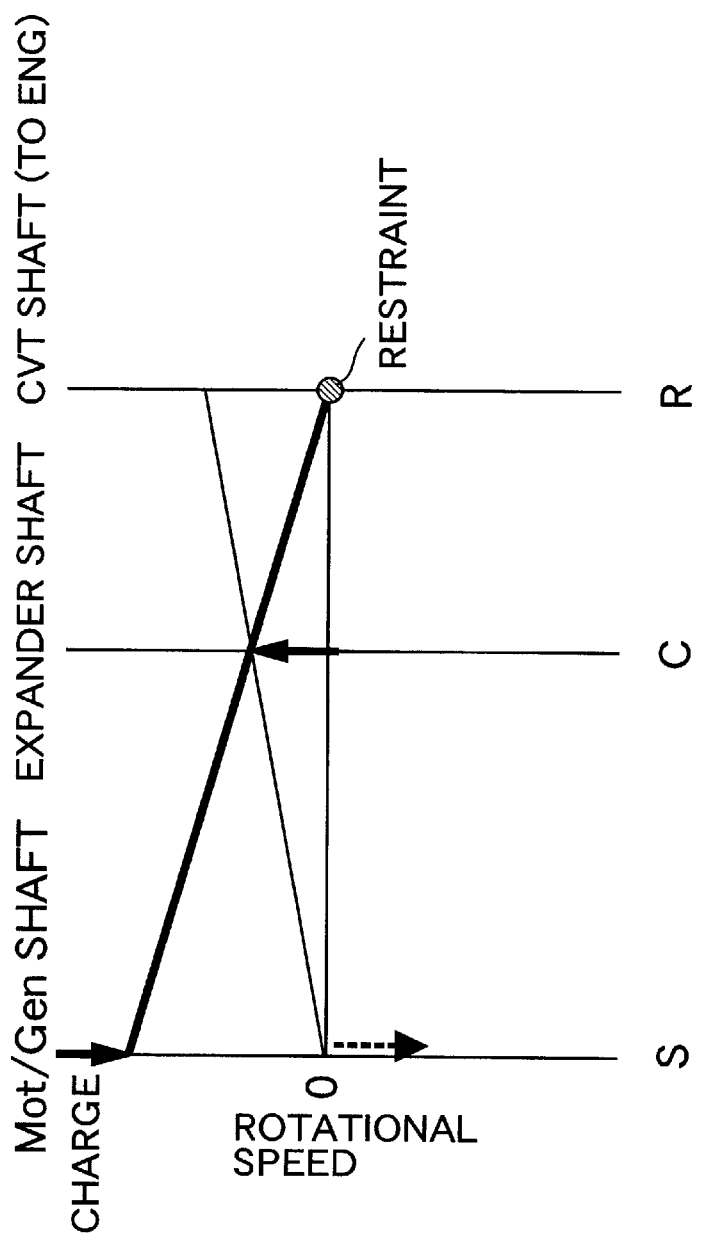
Figure 12:
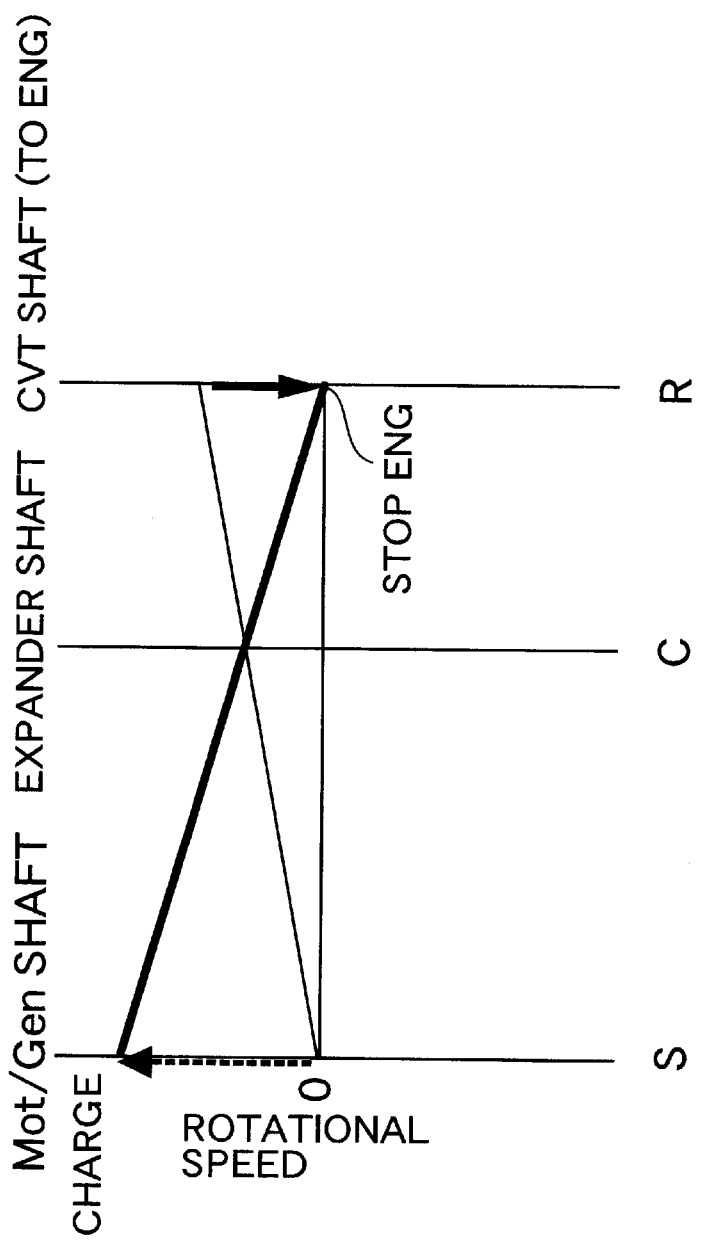

FIGS. 11 and 12 show the case where a rotational speed of the internal combustion engine 1 rapidly increases or decreases and a rotational speed of the expander 4 cannot change accordingly. In this case, the clutch 148 on the output shaft 137 of the belt-type continuously variable transmission 123 is disengaged to prevent overload being applied to the expander 4, and the ring gear brake 133 is engaged to restrain the rotation of the ring gear 126. Hence, the power generator/motor 124 is driven by the shaft output of the expander 4 and is caused to function as a motor, so that the battery 134 can be charged by generated electricity.

Figure 13:
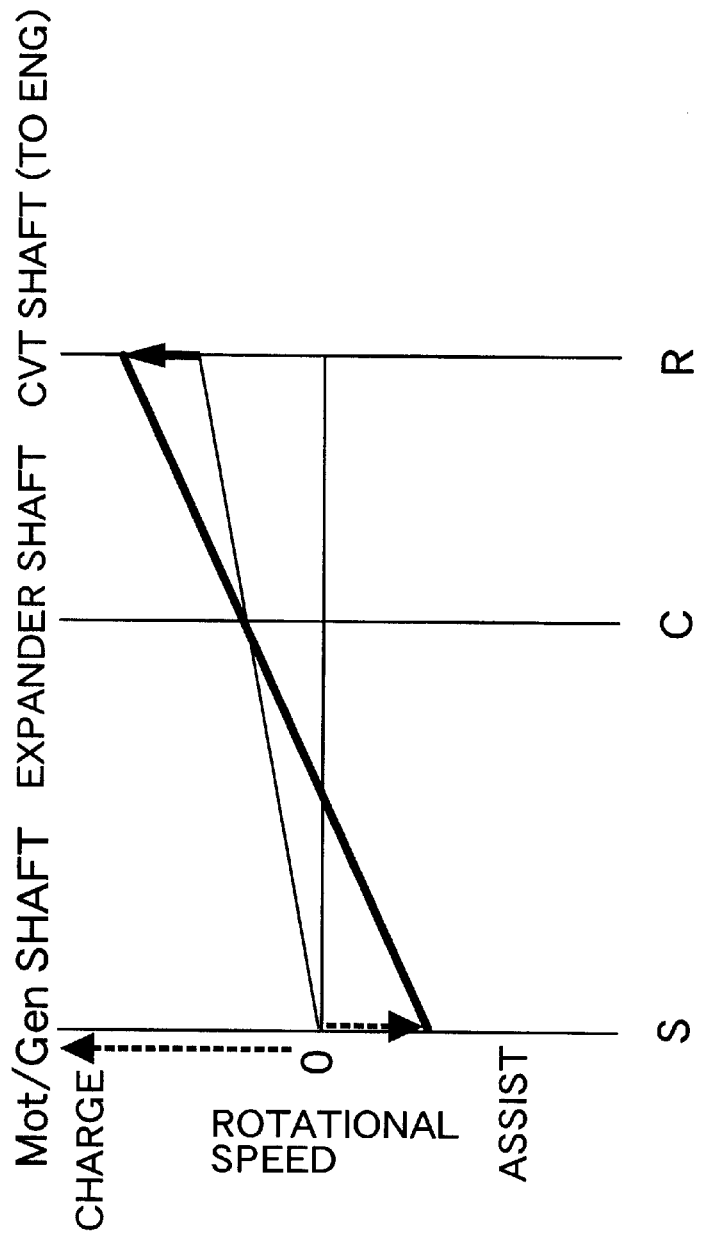

FIG. 13 shows the case where a rotational speed of the internal combustion engine 1 rapidly increases upon climbing and so on, a rotational speed of the expander 4 cannot increase accordingly, and the shaft output of the internal combustion engine 1 needs to be assisted by the shaft output of the expander 4. In this case, in a state in which the carrier brake 130, the sun gear brake 132, and the ring gear brake 133 are all disengaged, the power generator/motor 124 is caused to function as a motor. Thus, the shaft output of the power generator/motor 124 is transmitted to the side of the belt-type continuously variable transmission 123 so as to assist the shaft output of the internal combustion engine 1.

As described above, the power transmission system 121 including the planetary gear mechanism 122 and the belt-type continuously variable transmission 123 is placed between the output shaft 129 of the expander 4 and the output shaft 137 of the internal combustion engine 1. Thus, it is possible to absorb a delay in response of a rotational speed of the expander 4 relative to a rotational speed of the internal combustion engine 1 and a difference between a rotational speed range of the internal combustion engine 1 and a rotational speed range of the expander 4, thereby effectively combining the shaft output of the expander 4 with the shaft output of the internal combustion engine 1. Namely, a change gear ratio of the belt-type continuously variable transmission 123 is controlled according to the output characteristics of the expander 4 within a range of the output characteristics, so that the expander 4 can be efficiently operated to effectively utilize thermal energy of exhaust gas. Further, the carrier brake 130, the sun gear brake 132, and the ring gear brake 133 of the planetary gear mechanism 122 are selectively engaged, so that transmission of driving force among three of the expander 4, the power generator/motor 124, and the internal combustion engine 1 can be changed in various manners according to an operating condition of a vehicle, and thermal energy of exhaust gas can be effectively used so as to contribute to improvement in performance of the vehicle.

Next, referring to FIGS. 15 to 24, the structure of the expander 4 will be discussed below.

In FIGS. 15 to 18, a casing 7 is formed by metallic first and second half bodies 8 and 9. The half bodies 8 and 9 are each formed by a main body 11, which has a concave part 10 being substantially oval, and a circular flange 12, which is integrated with the main body 11. The circular flanges 12 are superposed one on another via a metallic gasket 13 so as to form a rotor chamber 14, which is substantially oval. Further, an external surface of the main body 11 of the first half body 8 is covered with a main body 16 of a shell-shaped member 15 that is shaped like a deep bowl. A circular flange 17 integrated with the main body 16 is overlaid on the circular flange 12 of the first half body 8 via a gasket 18. The three circular flanges 12, 12, and 17 are engaged by a bolt 19 at a plurality of places in a circumferential direction. Thus, a relay chamber 20 is formed between the main bodies 11 and 16 of the shell-shaped member 15 and the first half body 8.

The main bodies 11 of the half bodies 8 and 9 have hollow bearing cylinders 21 and 22, which protrude outward, on the external surfaces. A large-diameter portion 24 of a hollow output shaft 23, which penetrates the rotor chamber 14, is rotatably supported on the hollow bearing cylinders 21 and 22 via a bearing metal (or bearing made of resin) 25. Hence, an axis line L of the output shaft 23 passes through an intersection point of a major axis and a minor axis in the rotor chamber 14, which is substantially oval. Moreover, a small-diameter portion 26 of the output shaft 23 protrudes outward from a hole 27, which exists on the hollow bearing cylinder 22 of the second half body 9, and the small-diameter portion 26 is connected to a transmission shaft 28 via a spline connection 29. Portions between the small-diameter portion 26 and the hole 27 are sealed with two seal rings 30.

A circular rotor 31 is stored in the rotor chamber 14, and a shaft mounting hole 32 at the center of the rotor 31 and the large-diameter portion 24 of the output shaft 23 are engaged with each other, and an engaging connection 33 is provided between the rotor 31 and the large-diameter portion 24. Thus, a rotation axis line of the rotor 31 conforms to the axis line L of the output shaft 23, so that "L" is used in common as a reference character of the rotation axis line.

A plurality of slot-shaped spaces 34 radially extend from the shaft mounting hole 32 with the rotation axis line L of the rotor 31 serving as the center. In the present embodiment, the twelve slot-shaped spaces 34 are formed on the circumference at equal intervals. The spaces 34 are substantially U-shaped in a virtual plane, which intersect end faces 35, such that the spaces 34 are opened sequentially on the end faces 35 and an outer peripheral surface 36 of the rotor 31 with a narrow width in a circumferential direction.

In the slot-shaped spaces 34, first to twelfth vane piston units U1 to U12 having identical structures are mounted so as to freely reciprocate in a radial direction as follows: in the substantially U-shaped spaces 34, stepped holes 38 are formed on parts 37 for dividing the inner periphery of the space 34, and stepped cylinder members 39 made of ceramic (or carbon) are fitted into the stepped holes 38. An end face of a small-diameter portion a of the cylinder member 39 is in contact with the outer peripheral surface of the large-diameter portion 24 of the output shaft 23, and a small-diameter portion hole b is connected to a through-hole c, which is opened on the outer peripheral surface of the large-diameter portion 24. Further, a guide cylinder 40 is placed on the outside of the cylinder member 39 so as to be positioned coaxially with the member 39. The outer end of the guide cylinder 40 is locked to an opening of the space 34, which exists on the outer peripheral surface of the rotor 31, and the inner end is fitted into a large-diameter portion hole d of the stepped hole 38 and is in contact with the cylinder member 39. Further, the guide cylinder 40 has a pair of long grooves e which extend so as to be opposed to each other from the outer end to the proximity of the inner end of the guide cylinder 40, and the long grooves e face the spaces 34. Pistons 41 made of ceramic are slidably fitted into large-diameter portion cylinder holes f of the cylinder members 39. The leading ends of the pistons 41 are always placed in the guide cylinders 40.

Figure 15:
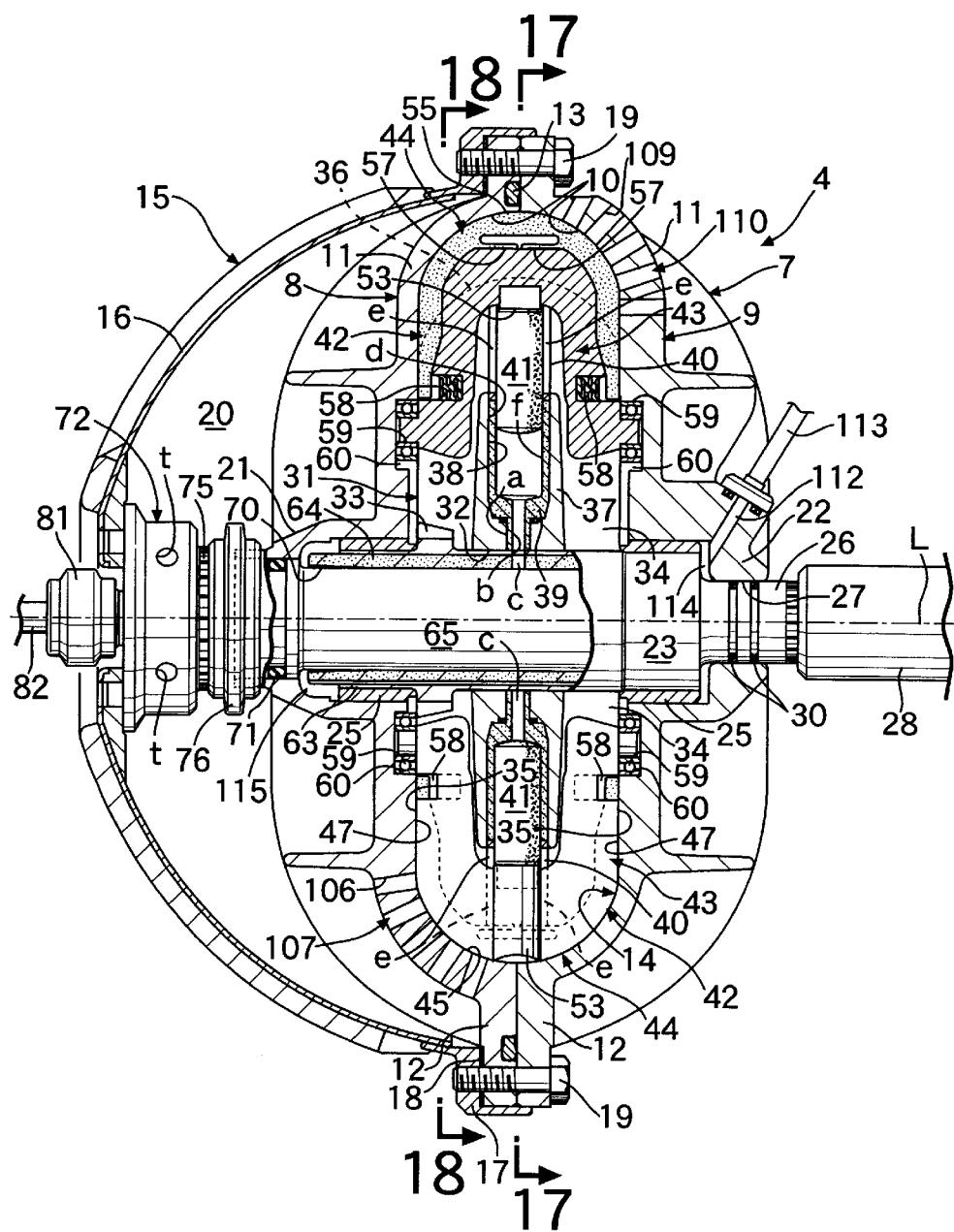
Figure 19:
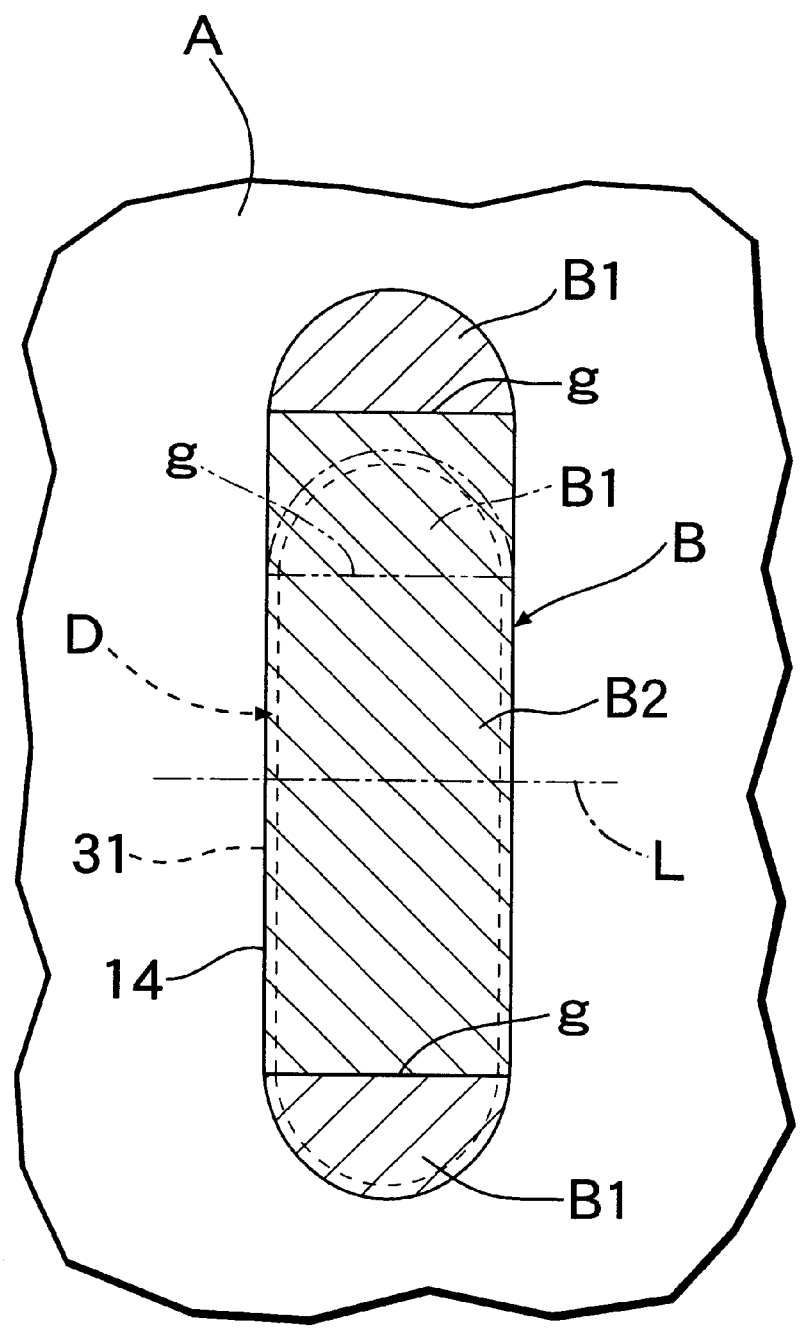
Figure 20:
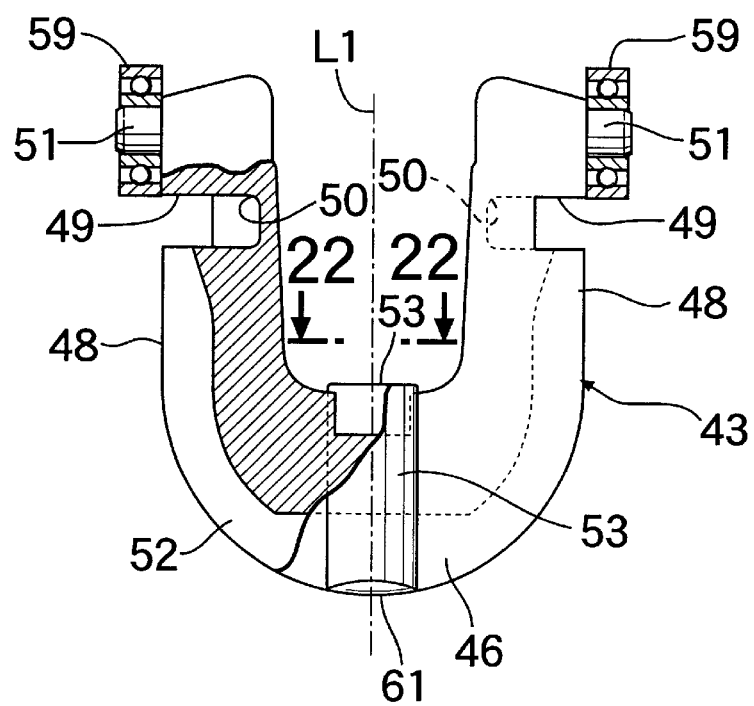
Figure 21:
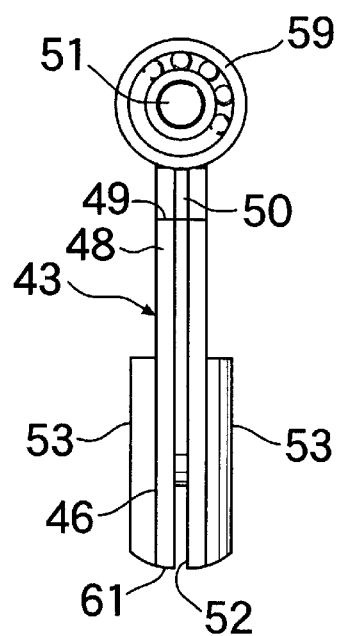
Figure 22:
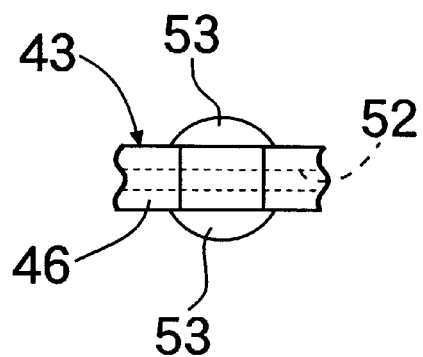
Figure 23:
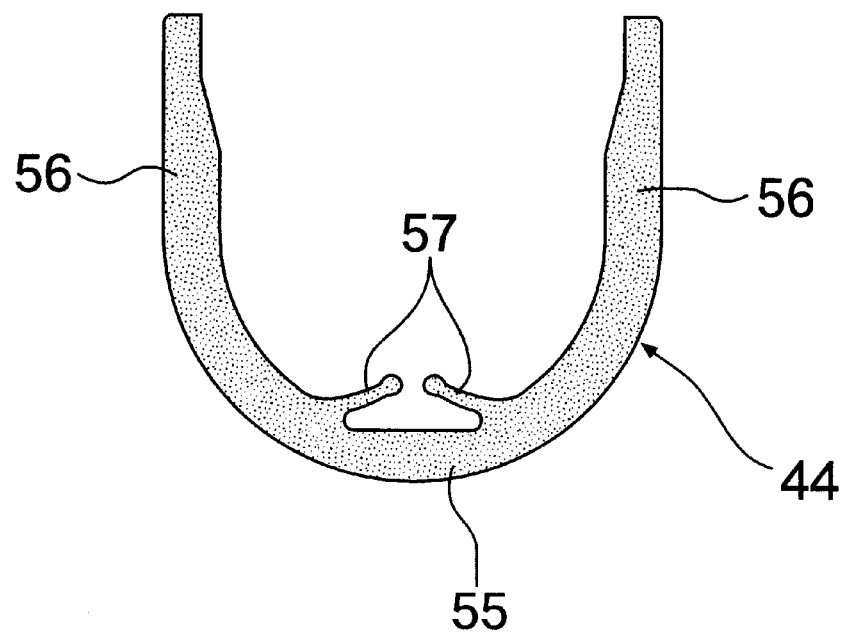

As shown in FIGS. 15 and 19, in a virtual plane A including the rotation axis line L of the rotor 31, a section B of the rotor chamber 14 is comprised of a pair of half-round sections B1 having diameters g opposed to each other, and a rectangular section B2 formed by connecting opposing ends and the other opposing ends of the diameters g of the half-round sections B1, so that the section B is substantially shaped like a field track shape. In FIG. 19, a solid line indicates the largest section including a major axis while a part indicated partially by a chain double-dashed line shows the smallest section including a minor axis. As indicated by a dotted line in FIG. 19, the rotor 31 has a section D which is somewhat smaller than the smallest section including a minor axis of the rotor chamber 14.

As shown in FIGS. 15 and 20 to 23, a vane 42 is formed by a vane body 43 which is in the form of a substantially U-shaped plate (horseshoe), a seal member 44 which is mounted on the vane body 43 and is in the form of a substantially U-shaped plate, and a vane spring 58.

The vane body 43 has a semi-arcuate portion 46, which corresponds to an inner peripheral surface 45 formed by the half-round section B1 of the rotor chamber 14, and a pair of parallel portions 48 that correspond to opposing inner end faces 47 formed by the rectangular section B2. On the end sides of the parallel portions 48, a rectangualr U-shaped notch 49 is provided, rectangular blind holes 50 are opened on the bottom of the notch 49, and a minor shaft 51 is provided which is closer to the end sides than the notch 49 and protrude to the outside. Further, U-shaped grooves 52 opened outward are sequentially formed on the outer peripheral portion of the semi-arcuate portion 46 and the parallel portions 48, and both ends of the U-shaped groove 52 are respectively connected to the notch 49. Moreover, a pair of protrusions 53 having segmental sections is provided on both planes of the semi-arcuate portion 46. The protrusions 53 are disposed such that the axis line L1 of a virtual circular cylinder comprised of the protrusions 53 conforms to a straight line which divides an interval between the parallel portions 48 into two equal parts and divides the semi-arcuate portion 46 into equal two parts in a circumferential direction. Besides, the inner ends of the protrusions 53 slightly protrude to a space between the parallel portions 48.

The seal member 44 is comprised of, for example, PTFE. The seal member 44 has a half segment 55, which slides the inner peripheral surface 45 formed by the half-round section B1 of the rotor chamber 14, and a pair of parallel portions 56, which slide opposing inner end faces 47 formed by the rectangular section B2. Also, a pair of elastic claws 57 are provided so as to be warped inward on the inner peripheral surface of the half segment 55.

The seal member 44 is mounted on the U-shaped groove 52 of the vane body 43, and a vane spring 58 is fitted into the blind hole 50. Additionally, a roller 59 having a ball bearing structure is mounted on the minor axis 51. The vanes 42 are slidably accommodated in the slot-shaped spaces 34 of the rotor 31. At this point, the protrusions 53 of the vane body 43 are positioned in the guide cylinder 40, and opposite sides of the protrusion 53 are respectively positioned in the long grooves e of the guide cylinder 40. Hence, the inner end faces of the protrusions 53 can be in contact with the outer end face of the piston 41. The rollers 59 are respectively engaged rotatably to annular grooves 60. The annular grooves 60 are substantially oval and are formed on the opposing inner end faces 47 of the first and second half bodies 8 and 9. A distance between the annular groove 60 and the rotor chamber 14 is constant over the circumference. Further, progressive motions of the pistons 41 are converted to rotational motion of the rotor 31 via the vanes 42 by using engagement between the rollers 59 and the annular grooves 60.

Figure 18:
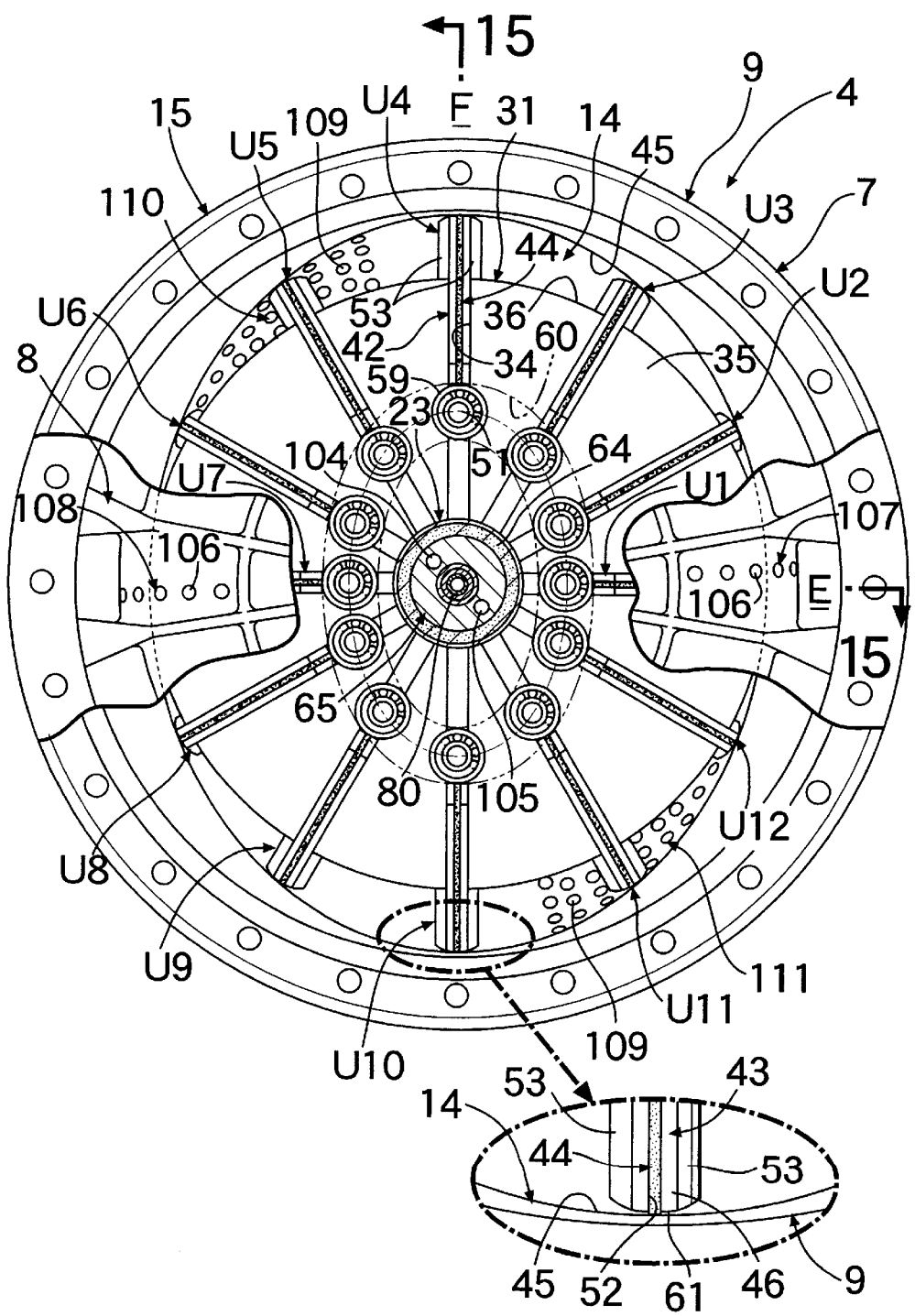

As shown in FIG. 18, due to a cooperation between the roller 59 and the annular grooves 60, a semi-arcuate end face 61 on the semi-arcuate portion 46 of the vane body 43 is always away from the inner peripheral surface 45 of the rotor chamber 14, and both of the parallel portions 48 are always away from the opposed inner end faces 47 of the rotor chamber 14, thereby reducing friction loss. And then, since an track is regulated by the annular groove 60 formed by a pair of protrusions, the vane 42 has rotation with a small displacement-type angle in a shaft direction via the roller 59 due to a lateral track error, thereby increasing contact pressure with the inner peripheral surface 45 of the rotor chamber 14. At this point, the vane body 43 in the form of a substantially U-shaped plate (horseshoe) is shorter in length in a diameter direction of a contact part with the casing 7 as compared with a square (rectangular) vane, thereby largely reducing the displacement volume. Moreover, as is apparently shown in FIG. 15, in the seal member 44, both of the parallel portions 56 are in intimate contact with the opposed inner end faces 47 of the rotor chamber 14 due to elastic force of each vane spring 58, and a sealing effect is carried out on the annular grooves 60 via the ends of the parallel portions 56 and the vanes 42. Besides, the semi-arcuate portion 55 is brought into close contact with the inner peripheral surface 45 by pressing both of the elastic claws 57 between the vane body 43 and the inner peripheral surface 45 in the rotor chamber 14. Namely, the vane 42 in the form of a substantially U-shaped plate does not have an inflection point in contrast to a square (rectangular) vane, resulting in good contact. A square vane has corners and the sealing property is hard to maintain. Thus, the sealing property is improved between the vanes 42 and the rotor chamber 14. Moreover, as thermal expansion proceeds, the vanes 42 and the rotor chamber 14 are deformed. At this point, in contrast to a square vane, the substantially U-shaped vane 42 is deformed more evenly with a similar Fig., resulting in few irregular clearances between the vanes 42 and the rotor chamber 14, and the sealing property can be maintained well.

Figure 16:
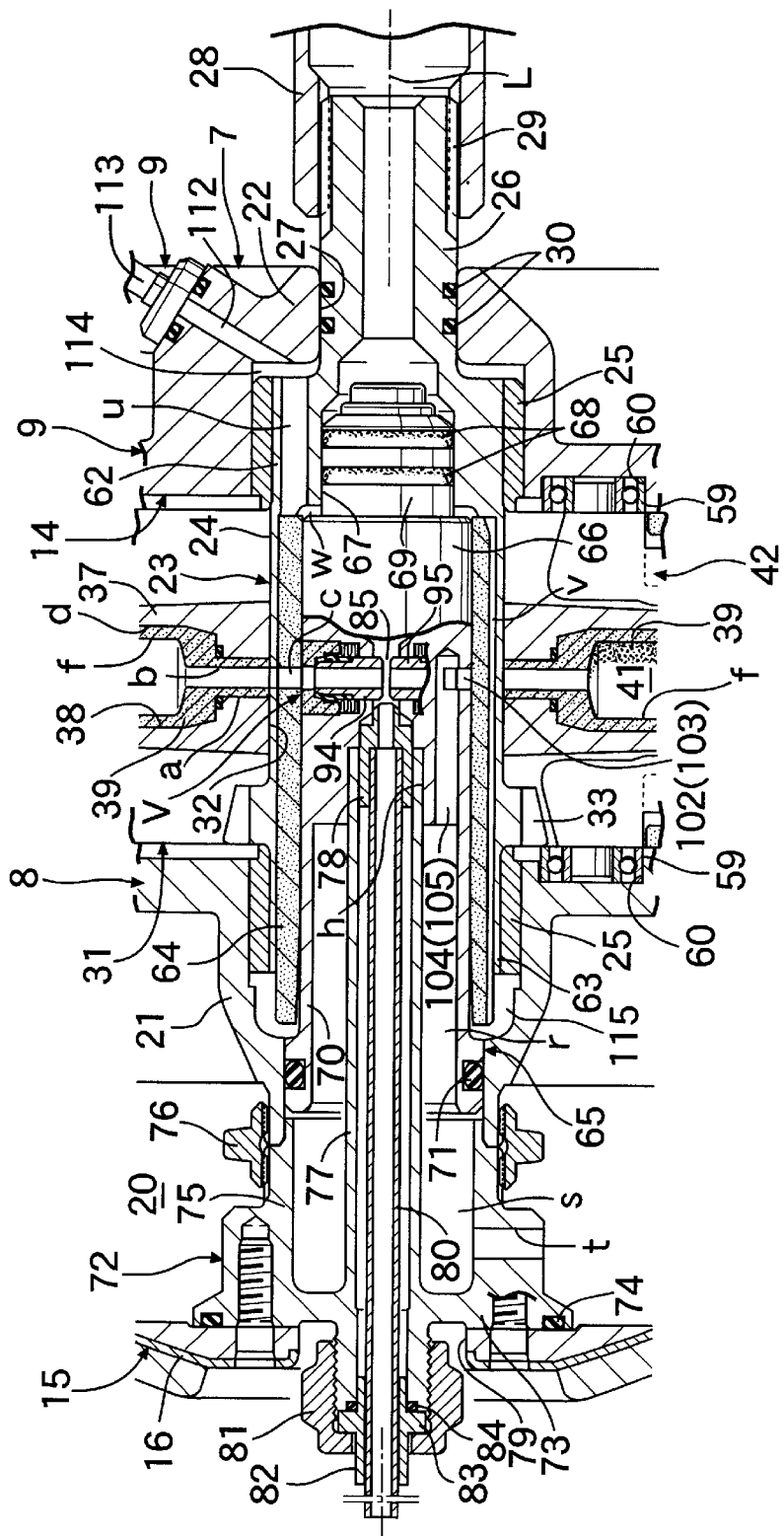

In FIGS. 15 and 16, the large-diameter portion 24 of the output axis 23 has a thick portion 62, which is supported by the bearing metal 25 of the second half body 9, and a thin portion 63, which extends from the thick portion 62 and is supported by the bearing metal 25 of the first half body 8. A hollow shaft 64 made of ceramic (or metal) is fitted into the thin portion 63 so as to rotate integrally with the output shaft 23. A fixed shaft 65 is placed inside the hollow shaft 64. The fixed shaft 65 is formed by a large-diameter solid portion 66, which is fitted into the hollow shaft 64 so as to be within a thickness of the rotor 31 in an axial direction, a small-diameter solid portion 69, which is fitted into holes 67 via two sealing rings 68, the holes 67 being placed on the thick portion 62 of the output shaft 23, and a thin hollow portion 70, which extends from the large-diameter solid portion 66 and is fitted into the hollow shaft 64. A seal ring 71 is provided between the end outer peripheral surface of the hollow portion 70 and the inner peripheral surface of the hollow bearing cylinder 21 of the first half body 8. In the main body 16 of the shell-shaped member 15, an end wall 73 of a hollow cylinder 72 is attached on the inner surface of the central part of the main body 16 via the seal ring 74. The hollow cylinder 72 is placed coaxially with the output shaft 23. The inner end of a short outer cylinder 75, which extends inward from the outer circumference of the end wall 73, is connected to the hollow bearing cylinder 21 of the first half body 8 via a connecting cylinder 76. An inner tube 77 is placed on the end wall 73 so as to penetrate the end wall 73 with a small diameter and a long length. The inner end of the inner tube 77 is fitted into a stepped hole h, which is placed on the large-diameter portion solid part 66 of the fixed shaft 65, together with a short hollow connecting tube 78 protruding from the inner end of the inner tube 77. The outer end of the inner tube 77 protrudes outward from a hole 79 of the shell-shaped member 15, and the inner end of a first high-temperature high-pressure vapor introduction tube 80, which is inserted into the inner tube 77 from the outer end of the inner tube 77, is fitted into the hollow connecting tube 78. A cap member 81 is screwed into the outer end of the inner tube 77. A flange 83 of the holder cylinder 82, which holds the introduction tube 80, is crimped by the cap member 81 onto the outer end face of the inner tube 77 via the seal ring 84.

Figure 24:
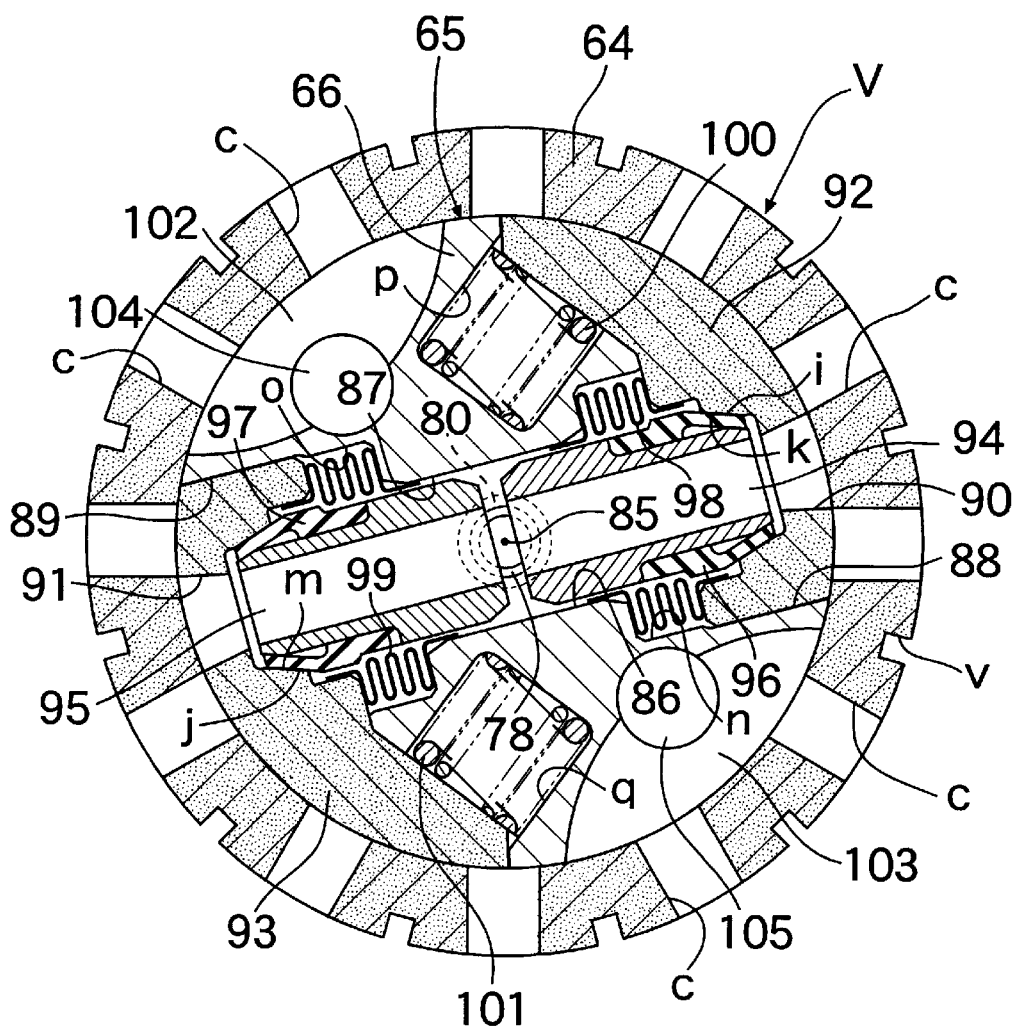

As shown in FIGS. 15 to 17 and 24, a rotating valve V is provided on the large-diameter portion solid part 66 of the fixed shaft 65 and on the cylinder member 39 of first to twelfth vane piston units U1 to U12. The rotating valve V supplies high-temperature high-pressure vapor via a plurality of through-holes c sequentially formed on the hollow shaft 64 and the output shaft 23, for example, twelve through-holes c in the present embodiment, and the rotating valve V discharges first dropped-temperature/pressure vapor after expansion from the cylinder members 39 via the through-holes c. The rotating valve V is formed as follows:

FIG. 24 shows the structure of the rotating valve V which supplies and discharges vapor to the cylinder members 39 of the expander 4 at a predetermined timing. In the large-diameter portion solid part 66, first and second holes 86 and 87 are formed so as to extend in opposite directions from a space 85 connected to the hollow connecting tube 78, and the first and second holes 86 and 87 are opened on the bottoms of first and second concave parts 88 and 89, which are opened on the outer peripheral surface of the large-diameter portion solid part 66. First and second sealing blocks 92 and 93, which are made of carbon and have feed openings 90 and 91, are mounted on the first and second concave parts 88 and 89. The outer peripheral surfaces of the sealing blocks 92 and 93 slide on the inner peripheral surface of the hollow shaft 64. In the first and second holes 86 and 87, short first and second feed tubes 94 and 95, which are coaxially disposed, are loosely inserted. Tapered outer peripheral surfaces i and j of first and second seal cylinders 96 and 97, which are fitted into the end-side outer peripheral surfaces of the first and second feed tubes 94 and 95, are disposed inside the feed openings 90 and 91 of the first and second sealing block 92 and 93, and the tapered outer peripheral surfaces i and j are fitted into the inner peripheral surfaces of tapered holes k and m, which are connected to the tapered outer peripheral surfaces i and j. Moreover, in the large-diameter solid portion 66, first and second annular concave portions n and o are formed for surrounding the first and second feed tubes 94 and 95, and first and second blind hole concave portions p and q being adjacent to the annular concave portions are formed so as to face the first and second sealing blocks 92 and 93. First and second bellows-shaped elastic bodies 98 and 99, each having one end fitted into the outer peripheral surfaces of the first and second seal cylinders 96 and 97, are stored in the first and second ring-shaped concave parts n and o. Further, first and second coil springs 100 and 101 are stored respectively in the first and second blind hole concave parts p and q. The first and second sealing blocks 92 and 93 are pressed onto the inner peripheral surface of the hollow shaft 64 by elastic force of the first and second bellows-like elastic bodies 98 and 99 and the first and second coil springs 100 and 101.

Besides, in the large-diameter portion solid part 66, between the first coil spring 100 and the second bellows-like elastic body 99 and between the second coil spring 101 and the first bellows-like elastic body 98, first and second concave discharging parts 102 and 103 are formed which are always connected to the two through-holes c, and first and second discharging holes 104 and 105 are formed which extend in parallel with the introduction tube 80 from the discharging parts 102 and 103 and are opened in a hollow part r of the fixed shaft 65.

Like the first sealing block 92 and the second sealing block 93, when the same kind of members are indicated by "first" and "second", the members are point symmetric with each other with respect to the axis line of the fixed shaft 65.

In the hollow part r of the fixed axis 65 and in the outer cylinder 75 of the hollow cylinder 72, a passage s for the first low-temperature low-pressure vapor is provided. The passage s is connected to the relay chamber 20 via a plurality of through-holes t penetrating a circumferential wall of the outer cylinder 75.

As described above, the rotating valve V is placed at the center of the expander 4, and high-temperature high-pressure vapor, which is supplied through the inside of the fixed shaft 65 placed at the center of the rotating valve V, is distributed to the cylinder members 39 according to the rotation of the rotor 31. Hence, it is possible to eliminate the necessity for a supply and exhaust valve used in an ordinary piston mechanism, thereby simplifying the configuration. Further, on the rotating valve V, the fixed axis 65 and the hollow axis 64 slide on each other on the small-diameter portion part having a low peripheral speed, resulting in compatibility between sealing property and wear resistance.

As shown in FIGS. 15 and 18, on the outer circumference of the main body 11 of the first half body 8, first and second introduction hole groups 107 and 108, which are each comprised of a plurality of introduction holes 106 arranged in a radius direction, are formed near both ends of a minor axis of the rotor chamber 14. The first low-temperature low-pressure vapor in the relay chamber 20 is introduced into the rotor chamber 14 via the introduction hole groups 107 and 108. Further, on the circumference of the main body 11 of the second half body 9, a first introduction hole group 110, which are comprised of a plurality of introduction holes 109 arranged in a radius direction and in a circumferential direction, is formed between an end of a major axis and the second introduction hole group 108. Moreover, a second introduction hole group 111, which are comprised of a plurality of introduction holes 109 arranged in a radius direction and in a circumferential direction, is formed between the other end of the major axis and the first introduction hole group 109. From the first and second introduction hole groups 110 and 111, due to expansion between the adjacent vanes 42, second low-temperature low-pressure vapor with lower temperature and pressure is discharged to the outside.

The output shaft 23 and so on are lubricated with water. A lubricating channel has the following configuration. Namely, as shown in FIGS. 15 and 16, a feed pipe 113 is connected to a feed hole 112, which is formed on the hollow bearing cylinder 22 of the second half body 9. The feed hole 112 is connected to a housing 114, where the bearing metal 25 on the second half body 9 faces, the housing 114 is connected to a water passage hole u formed on the thick portion 62 of the output shaft 23, the water passage hole u is connected to a plurality of water passage grooves v (see FIG. 24) extending in a direction of a bus on the outer peripheral surface of the hollow shaft 64, and the water passage grooves v are each connected to a housing 115 where the bearing metal 25 on the second half body 8 faces. Moreover, on the inner end face of the thick portion 62 of the output shaft 23, a ring-shaped concave part w is provided, which connects the water passage hole u and a sliding part between the hollow shaft 64 and the large-diameter portion solid part 66 of the fixed shaft 65.

Hence, lubrication is made with water between the bearing metals 25 and the output shaft 23 and between the hollow shaft 64 and the fixed shaft 65, and lubrication is made between the casing 7, the seal member 44, and the rollers 59 with water which enters the rotor chamber 14 from a gap between both of the bearing metals 25 and the output shaft 23.

Figure 17:
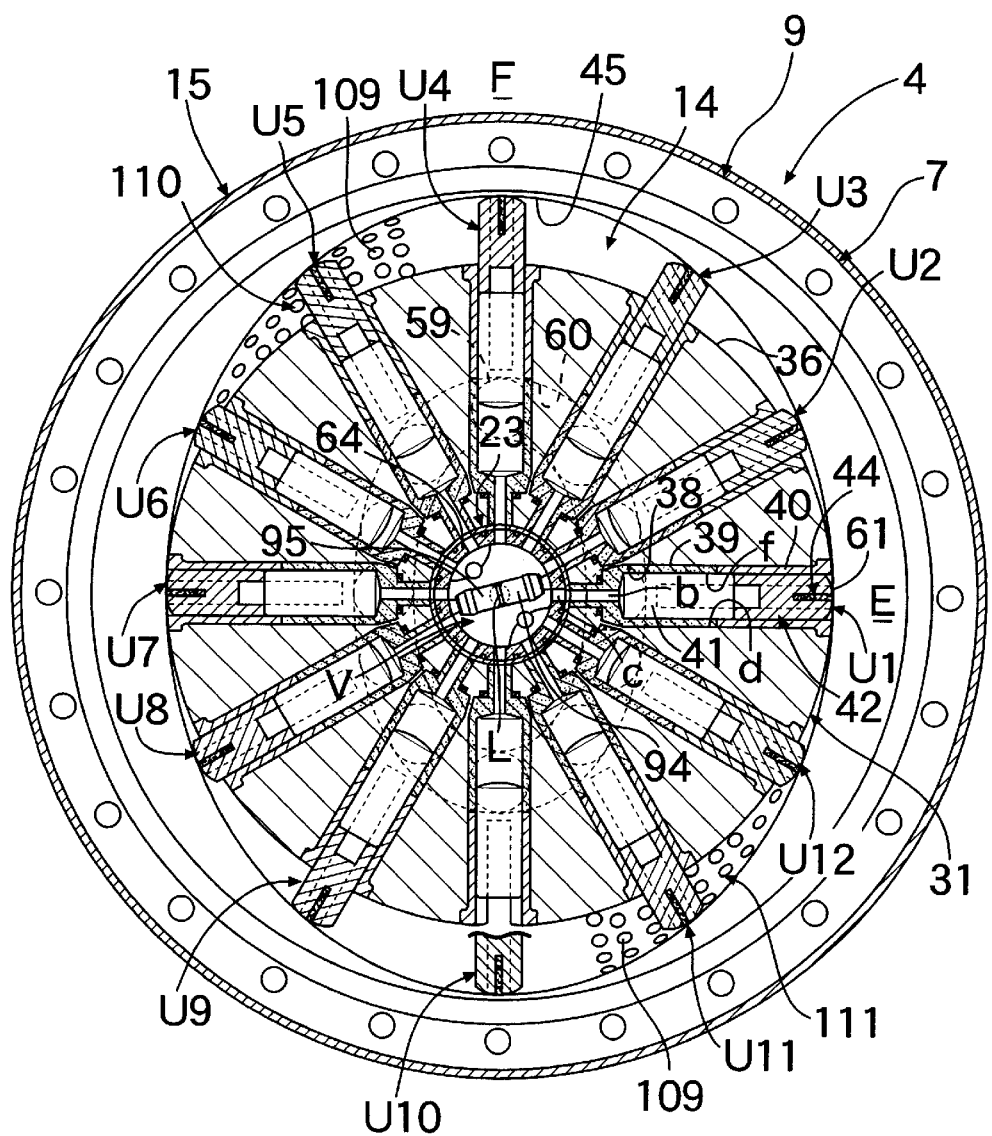

In FIG. 17, the same operation is performed by the first and seventh vane piston units U1 and U7, which are point symmetric with respect to the rotation axis line L of the rotor 31. The same operation is also performed by the second and eighth vane piston units U2 and U8 and so on, which are point symmetric with each other.

For example, referring to FIG. 24, it is assumed that an axis line of a first feed tube 94 is slightly shifted counterclockwise from a minor axis position E of the rotor chamber 14 in FIG. 17, the first vane piston unit U1 is placed on the minor axis position E, high-temperature high-pressure vapor is not supplied to a large-diameter portion cylinder hole f, so that the pistons 41 and the vanes 42 are positioned on retreating positions.

In this state, when the rotor 31 is slightly rotated counterclockwise in FIG. 17, the feed opening 90 of the first sealing block 92 and the through-hole c are connected to each other, and high-temperature high-pressure vapor from the introduction tube 80 is introduced to the large-diameter portion cylinder hole f through the small diameter hole b. Thus, the pistons 41 are moved forward. Since the vane 42 slides to a major axis position F of the rotor chamber 14, the forward motion is converted to rotational motion via the vane 42 by engagement of the ring groove 60 and the roller 59, which is integrated with the vane 42. When the through-hole c is shifted from the feed opening 90, high-temperature high-pressure vapor is expanded in the large-diameter portion cylinder hole f and further moves forward the pistons 41. Thus, the rotation of the rotor 31 continues. The expansion of high-temperature high-pressure vapor is completed when first vane piston unit U1 reaches the major axis position F of the rotor chamber 14. Thereafter, the pistons 41 are caused to retreat by the vanes 42, so that the first low-temperature low-pressure vapor in the large cylinder hole f is discharged to the relay chamber 20 via the small-diameter portion hole b, the through-hole c, the first concave discharging part 102, the first discharging hole 104, the passages (see FIG. 16), and the through-hole t, according to the rotation of the rotor 31. Subsequently, as shown in FIGS. 15 and 18, the vapor is introduced to the rotor chamber 14 via the first introduction hole group 107, the vapor is further expanded between the adjacent vanes 42 to rotate the rotor 31, and then, the second low-temperature low-pressure vapor is discharged to the outside from the first introduction hole group 110.

In this way, the pistons 41 are operated by expansion of high-temperature high-pressure vapor, the rotor 31 is rotated via the vanes 42, or the rotor 31 is rotated via the vanes 42 by expansion of low-temperature low-pressure vapor, which is generated by reducing a pressure of the high-temperature high-pressure vapor, so as to obtain output from the output shaft 23.

Besides, in addition to Examples, as a configuration for converting forward motion of the pistons 41 to rotational motion of the rotor 31, forward motion of the pistons 41 may be directly transmitted to the rollers 59 without passing through the vanes 42 and may be converted to rotational motion by engagement with the ring grooves 60. Moreover, due to cooperation of the rollers 59 and the ring grooves 60, as described above, the vanes 42 only need to be separated from the inner peripheral surface 45 and the opposing inner end faces 47 of the rotor chamber 14 all the time substantially at a fixed interval. The pistons 41 and the rollers 59, and the vanes 42 and the rollers 59 may mainly cooperate with the ring groove 60.

When the expander 4 is used as a compressor, the rotor 31 is rotated clockwise by the output shaft 23 in FIG. 17, outside air as fluid is absorbed by the vanes 42 into the rotor chamber 14 from the first and second introduction hole groups 110 and 111, low-compressed air obtained thus is supplied to the large-diameter portion cylinder hole f from the first and second introduction hole groups 107 and 108 via the relay chamber 20, the through-holes t, the passage s, the first and second discharging holes 104 and 105, the first and second concave discharging parts 102 and 103, and the through-hole c. Further, the pistons 41 are operated to convert low-pressure air to high-pressure air by means of the vane 42, and the high-pressure air is introduced to the introduction tube 80 via the through-hole c, the feed openings 90 and 91, and the first and second feed tubes 94 and 95.

As is apparent from FIG. 18, a vane-type fluid machine such as a vane pump, a vane motor, a blower, and a vane compressor can be formed by the above described components. Namely, the vane-type fluid machine comprises the casing 7 having the rotor chamber 14, the rotor 31 stored in the rotor chamber 14, and the plurality of vanes 42 which are radially disposed around the rotation axis line L and freely reciprocate in a radial direction on the rotor 31. The section B of the rotor chamber 14 on the virtual plane A, which includes the rotation axis line L of the rotor 31, is comprised of the pair of half-round sections B1 having the diameters g opposed to each other, and the rectangular section B2 formed by connecting opposing ends and the other opposing ends of the diameters g. Each of the vanes 42 is comprised of the vane body 43 and the seal member 44, which is mounted on the vane body 43 and is pressed to the rotor chamber 14 by spring force, centrifugal force, and vapor power. The seal member 44 has the half segment 55 for sliding the inner peripheral surface 45 formed by the half-round section B1 of the rotor chamber 14, and the pair of parallel portions 56 for respectively sliding the opposing inner end faces 47 formed by the rectangular section B2. In this case, each of the vane main bodies 43 has a pair of parallel portions 48 corresponding to the parallel portions 56 of the seal member 44, the rollers 59 placed on the parallel portions 48 are rotatably engaged with the ring grooves 60 formed on the opposing inner end faces 47 of the casing 7 such that the end faces of the vane main bodies 43 are always separated from the inner peripheral surface 45 of the rotor chamber 14.

Therefore, the sealing effect between the vane main bodies 43 and the inner peripheral surface of the rotor chamber 14 is generated by spring force of the seal member 44, centrifugal force applied to the seal member 44, and vapor power which is produced by vapor pressing upward the seal member 44. The vapor enters the U-shaped grooves 52 of the vane main bodies 43 from the rotor chamber 14. In this way, the above sealing effect is not affected by excessive centrifugal force, which is applied to the vane main bodies 43 according to the number of revolutions of the rotor 31. Thus, a sealing contact pressure does not depend on centrifugal force applied to the vane main bodies 43, thereby always obtaining compatibility of fine sealing property and low friction.

It should be noted here that Japanese Patent Application Laid-open No. 59-41602 discloses a double multi-vane rotating machine. In this machine, a circular vane supporting ring is placed between an oval outer cam ring and an oval inner cam ring, and outer ends and inner ends of a plurality of vanes, which are supported on the vane supporting ring in a radius direction so as to freely slide, are respectively brought into contact with the inner peripheral surface of the outer cam ring and the outer peripheral surface of the inner cam ring. Therefore, when the vane supporting ring rotates relative to the outer cam ring and the inner cam ring, a plurality of operating chambers, which are divided by vanes between the outer cam ring and the vane supporting ring, increases and decreases in capacity so as to act as an expander or compressor, and a plurality of operating chambers, which are divided by vanes between the inner cam ring and the vane supporting ring, increases and decreases in capacity so as to act as an expander or a compressor.

In the above double multi-vane rotating machine, the outer and inner rotating machines can be used as independent expanders, the outer and inner rotating machines can be used as independent compressor, and the outer and inner rotating machines can be respectively used as an expander and a compressor.

Further, Japanese Patent Application Laid-open No. 60-206990 discloses a vane-type rotating machine which can be used as an expander or a compressor. In this machine, between a circular outer cam ring and a circular inner cam ring that are disposed concentrically, a circular intermediate cylinder is eccentrically disposed, the outer ends and inner ends of a plurality of vanes, which are supported by the intermediate cylinder in a radius direction so as to freely slide, are respectively brought into contact with the inner peripheral surface of the outer cam ring and the outer peripheral surface of the inner cam ring. Therefore, when the intermediate cylinder rotates relative to the outer cam ring and the inner cam ring, a plurality of operating chambers, which are divided by vanes between the outer cam ring and a vane supporting ring, increases and decreases in capacity so as to act as an expander or a compressor, and a plurality of operating chambers, which are divided by vanes between the inner cam ring and the vane supporting ring, increases and decreases in capacity so as to act as an expander or a compressor.

In the above vane-type rotating machine, the outer and inner rotating machines can be used as independent expanders, and the outer and inner rotating machines can be used as independent compressors. Besides, the outer and inner rotating machines can be connected in series to operate as a two-stage expander or a two-stage compressor by causing working fluid, which has passed through one of the outer and inner rotating machines, to pass through the other rotating machine.

Further, Japanese Patent Application Laid-open No. 57-16293 discloses a vane-type rotary compressor. In this compressor, a circular rotor is rotatably disposed in a noncircular cam ring, and in order to shift the ends of a plurality of vanes, which are radially supported by the rotor, along the inner peripheral surface of the cam ring, a roller placed at the midpoint between vanes is guided while being engaged with a roller track placed on the casing.

Moreover, Japanese Patent Application Laid-open No. 64-29676 discloses a radial plunger pump. In this pump, a plurality of cylinders are radially formed on a rotor which is disposed eccentrically in a circular cam ring, and the ends of plungers, which are fitted into the cylinders so as to freely slide, are brought into contact with the inner peripheral surface of the cam ring, and reciprocating motion is carried out, so that the radial plunger pump is operated as a pump.

Moreover, Japanese Patent Application Laid-open No. 58-48076 discloses a Rankine cycle device comprising a vane-type expander. In the device, energy of high-temperature high-pressure vapor, which is generated by an evaporator using a gas burner as a heat source, is converted to mechanical energy via a vane-type expander, and after low-temperature low-pressure vapor generated thus is condensed by a condenser, the vapor is returned to the evaporator again via a feed pump.

Incidentally, Japanese Patent Application Laid-open No. 59-41602 and Japanese Patent Application Laid-open No. 60-206990 disclose a plurality of vane-type rotating machines placed inside and outside in a radius direction. The vane-type rotating machine has a simple configuration of a conversion mechanism for pressure energy and mechanical energy. While it is possible to process a large quantity of working fluid with a compact configuration, it is difficult to improve efficiency due to a large quantity of leakage of working fluid from a sliding part of the vane.

Besides, regarding the radial plunger pump disclosed in Japanese Patent Application Laid-open No. 64-29676, working fluid has excellent sealing property because the working fluid is compressed by the piston which is fitted into the cylinder so as to freely slide, so that even when high-pressure working fluid is used, it is possible to minimize a reduction in efficiency that is caused by leakage. Meanwhile, a crank mechanism and a swash plate mechanism are necessary for converting reciprocating motion to rotational motion, resulting in a complicated configuration.

Therefore, it is desirable that a merit of a piston type and a merit of a vane type be compatible with each other in the rotating fluid machine.

Hence, in the above described expander 4, first energy conversion means comprised of the cylinder members 39 and the pistons 41, and second energy conversion means comprised of the vanes 42 are provided in the rotor 31, which is used in common. With the cooperation between the first and second energy conversion means connected in series, energy of high-temperature high-pressure high vapor can be taken out to the output shaft 23 as mechanical energy. Therefore, it is possible to automatically combine mechanical energy output from the first energy conversion means and mechanical energy output from the second energy conversion means via the rotor 31, thereby eliminating the necessity for special energy combining means having power transmission means such as a gear.

Since the first energy conversion means includes combination of the cylinder 39 and the piston 41 that can seal working fluid with ease and suppress the occurrence of leakage, it is possible to improve the sealing property of high-temperature high-pressure vapor and to minimize a reduction in efficiency that is caused by leakage. Meanwhile, the second energy conversion means is comprised of the vanes 42 which are supported on the rotor 31 so as to be freely shifted in a radial direction. Thus, vapor pressure applied to the vanes 42 is directly converted to rotational motion of the rotor 31, thereby eliminating the necessity for a special mechanism for converting reciprocating motion to rotational motion, resulting in a simple configuration. Additionally, the second energy conversion means for effectively converting a large quantity of vapor to mechanical energy even at a low pressure is disposed so as to surround the first energy conversion means. Thus, the expander 4 can be entirely reduced in size.

The first energy conversion means, which is comprised of the cylinders 39 and the pistons 41, achieves high conversion efficiency between pressure energy and mechanical energy when high-temperature high-pressure vapor is used as working fluid. Further, the second energy conversion means comprised of the vanes 42 is relatively high in conversion efficiency between pressure energy and mechanical energy even when low-temperature low-pressure vapor is used as working fluid. Therefore, the first and second energy conversion means are connected, in series, high-temperature high-pressure vapor is firstly caused to pass through the first energy conversion means and is converted to mechanical energy, so that first low-temperature low-pressure vapor with a lower pressure is caused to pass through the second energy conversion means and is converted to mechanical energy again. Hence, energy included in the original high-temperature high-pressure vapor can be fully converted to mechanical energy in an effective manner.

Additionally, even when the expander 4 of the present embodiment is used as a compressor, the rotor 31 is rotated by mechanical energy from the outside, air inhaled into the rotor chamber 14 is compressed and increased in temperature by the second energy conversion means, which is effectively operated even by relatively low-temperature low-pressure working fluid, and the compressed air with an increased temperature is further compressed and increased in temperature by the first energy conversion means, which is effectively operated by relatively high-temperature high-pressure working fluid. Hence, mechanical energy can be efficiently converted to pressure energy (thermal energy) of compressed air. Thus, with combination of the first energy conversion means comprised of the cylinder 39 and the piston 41, and the second energy conversion means comprised of the vanes 42, it is possible to obtain a high-performance rotating fluid machine which combines the characteristics of the first and second energy conversion means.

Further, the rotation axis line L of the rotor 31 (that is, the rotation axis L of the output shaft 23) conforms to the center of the rotor chamber 14, and when the rotor 31 is divided into four by 90° longitudinally and laterally in FIGS. 17 and 18, pressure energy is converted to mechanical energy in the upper right quadrant and the lower left quadrant, which are point symmetric with respect to the rotation axis line L. Thus, it is possible to prevent unbalanced load from being applied to the rotor 31, thereby suppressing the occurrence of vibration. Namely, a part for converting pressure energy of working fluid to mechanical energy and a part for converting mechanical energy to pressure energy of working fluid are positioned on two places shifted by 180° around the rotation axis line L serving as the center. Thus, load applied to the rotor 31 is used as couple and achieves smooth rotation, and suction timing and discharging timing can be more efficient.

Namely, the rotating fluid machine comprises at least the first energy conversion means and the second energy conversion means, inputs working fluid having pressure energy to the first and second energy conversion means to convert the pressure energy to mechanical energy, so that the rotating machine can function as an expander for combining mechanical energy generated by the first and second energy conversion means and outputting the mechanical energy, and besides, the rotating machine inputs mechanical energy to the first and second energy conversion means to convert the mechanical energy to pressure energy of working fluid, so that the rotating machine can function as a compressor for combining pressure energy of working fluid that is generated by the first and second energy conversion means and outputting the pressure energy. In the above rotating fluid machine, the first energy conversion means is formed by the cylinders which are formed radially on the rotor rotatably stored in the rotor chamber, and the pistons which slide in the cylinders. The second energy conversion means is formed by the vanes which are placed in a radial direction from the rotor and have the outer peripheral surfaces sliding on the inner peripheral surface of the rotor chamber.

According to the first arrangement, the first energy conversion means is formed by the cylinders which are formed radially on the rotor rotatably stored in the rotor chamber, and the pistons which slide in the cylinders. Thus, it is possible to improve the sealing property of high-pressure working fluid and to minimize a reduction in efficiency that is caused by leakage. Moreover, the second energy conversion means is formed by the vanes which are movably supported on the rotor in a radial direction and slide on the inner peripheral surface of the rotor chamber. Hence, the conversion mechanism for pressure energy and mechanical energy can be simplified, and a large amount of working fluid can be processed with a compact configuration. In this way, with combination of the first energy conversion means having the pistons and cylinders and the second energy conversion means having the vanes, it is possible to obtain a high-performance rotating fluid machine which has the characteristics of the first and second energy conversion means.

In addition to the first arrangement, the first energy conversion means alternately converts reciprocating motion of the piston and rotational motion of the rotation shaft, and the second energy conversion means alternately converts the shift of the vanes in a circumferential direction and the rotational motion of the rotation shaft.

According to the second arrangement, the first energy conversion means alternately converts reciprocating motion of the piston and the rotational motion of the rotation shaft, and the second energy conversion means alternately converts a shift of the vane in a circumferential direction and the rotational motion of the rotation shaft. Hence, fluid is compressed by the first and second energy conversion means by inputting external force from the rotation shaft, and the rotation shaft can be driven by the first and second energy conversion means by supplying high-pressure fluid. Hence, mechanical energy can be combined and output by the first and second energy conversion means, or pressure energy of working fluid can be combined and output by the first and second energy conversion means.

In addition to the second arrangement, the rotation shaft supports the rotor.

According to the third arrangement, since the rotor is supported by the rotation shaft, mechanical energy generated by the pistons placed on the rotor, the cylinders, or the vanes can be efficiently output to the rotation shaft, and only by inputting mechanical energy to the rotation shaft, working fluid can be efficiently compressed by the pistons, which are placed on the rotor supported on the rotation shaft, the cylinders, or the vanes.

Further, in addition to the first arrangement, in the case of the function as an expander, a total quantity of working fluid passing through the first energy conversion means passes through the second energy conversion means, and in the case of the function as a compressor, a total quantity of working fluid passing through the second energy conversion means passes through the first energy conversion means.

According to the fourth arrangement, the first and second energy conversion means are connected in series, in the case of the function as an expander, high-pressure working fluid is initially caused to pass through the first energy conversion means to partially convert pressure energy to mechanical energy, and working fluid reduced in pressure is further caused to pass through the second energy conversion means to convert the remaining pressure energy to mechanical energy. Thus, pressure energy of the working fluid can be efficiently converted to mechanical energy. Conversely, in the case of the function as a compressor, the rotation shaft is rotated by the mechanical energy, working fluid is compressed by the second energy conversion means, and the compressed working fluid is further compressed by the first energy conversion means, so that mechanical energy can be efficiently converted to pressure energy of working fluid.

Moreover, in addition to the first arrangement, in the case of the function as an expander, pressure energy of working fluid is converted to mechanical energy at two places where the rotor is shifted in phase by 180°. In the case of the function as a compressor, mechanical energy is converted to pressure energy of working fluid at two places where the rotor is shifted in phase by 180°.

According to the fifth arrangement, a part for converting pressure energy of working fluid to mechanical energy or a part for converting mechanical energy to pressure energy of working fluid is disposed at two places where the rotor is shifted in phase by 180°. Hence, load applied to the rotor serves as couple so as to achieve smooth rotation of the rotor, and it is possible to improve efficiency of suction timing and discharging timing.

Further, Japanese Patent Application Laid-open No. 59-41602 and Japanese Patent Application Laid-open No. 60-206990 disclose that the vanes are pressed by pressure of high-pressure fluid in a circumferential direction to rotate the rotor, or the rotor is rotated by external force and fluid is compressed by the vanes. When the pistons are provided in addition to the vanes, the pistons being fitted into the cylinders so as to freely slide, the cylinders being placed radially on the rotor, and conversion is made between mechanical energy and pressure energy of working fluid by using the pistons reciprocating in the cylinders in synchronization with the vanes, a mechanism is necessary for converting reciprocating motion of the pistons to rotational motion of the rotor (e.g., a crank mechanism or a swash plate mechanism), and the configuration of the device is entirely complicated, resulting in a larger size and weight.

Further, Japanese Patent Application Laid-open No. 57-16293 discloses that the roller placed at the midpoint between the vanes is guided while being engaged to the roller track placed in the casing. The vane only generates load in a circumferential direction but does not generate load in a radius direction. Hence, the engagement between the roller and the roller track does not contribute to conversion between mechanical energy and pressure energy of working fluid.

Moreover, Japanese Patent Application Laid-open No. 64-29676 discloses the radial plunger pump. Since the rotor is placed so as to be eccentric on the inside of the circular cam ring, unbalanced load is applied to the rotation shaft and vibration occurs.

Therefore, in the rotating fluid machine comprising the pistons and the vanes that are placed on the rotor and are integrally moved, it is desirable to smoothly convert mechanical energy and pressure energy of working fluid with a simple configuration, and to properly control a gap between the outer peripheral surface of the vane and the inner peripheral surface of the rotor chamber.

Hence, in the above described expander 4, the first energy conversion means formed by the cylinder members 39 and the pistons 41, and the second energy conversion means formed by the vanes 42 are provided on the rotor 31, which is used in common. With cooperation of the first and second energy conversion means, energy of high-temperature high-pressure vapor is taken out to the output shaft 23 as mechanical energy. In the first energy conversion means formed by the cylinder members 39 and the pistons 41, the rollers 59 placed on the vane piston units U1 to U12 are rotatably engaged to the ring groove 60. The vane piston units U1 to U12 reciprocate in a radial direction by the pistons 41. The ring groove 60 is placed on the first and second half bodies 8 and 9 and is substantially oval. Therefore, the reciprocating motion of the pistons 41, that is, the reciprocating motion of the vane piston units U1 to U12 is converted to rotational motion of the rotor 31 via the rollers 59 and the ring grooves 60. In this way, since the rollers 59 and the ring groove 60 are used, it is necessary to eliminate the necessity for a complicated and large crank mechanism and swash plate mechanism for converting the reciprocating motion to a rotational motion, to simplify the configuration of the expander 4 with a compact configuration, and to minimize energy loss resulting from friction.

Moreover, the second energy conversion means formed by the vanes 42 can efficiently process a large quantity of vapor with quite a simple configuration in which the rotor 31 is rotated in response to pressure of the first low-temperature low-pressure vapor being reduced in temperature and pressure by the first energy conversion means. And then, mechanical energy output by the first energy conversion means, which is operated by high-temperature high-pressure vapor, and mechanical energy output by the second energy conversion means, which is operated by the first low-temperature low-pressure vapor, are combined and output. Hence, it is possible to fully use energy of original high-temperature high-pressure vapor so as to improve efficiency of converting energy of the expander 4.

Moreover, when the vane piston units U1 to U12 reciprocate in a radial direction relative to the rotor 31, the rollers 59 placed in the vane piston units U1 to U12 are guided by the ring grooves 60. Hence, it is possible to maintain a constant gap between the outer peripheral surface of the vane 42 and the inner peripheral surface of the rotor chamber 14. Additionally, the sealing effect between the vane body 43 and the inner peripheral surface the rotor chamber 14 is generated by spring force of the seal member 44, centrifugal force applied to the seal member 44, and vapor pressure generated by vapor which enters the U-shaped grooves 52 of the vane main bodies 43 from the rotor chamber 14 on a high-pressure side and which presses upward the seal member 44. Hence, the sealing effect is not affected by excessive centrifugal force applied to the vane body 43 according to the number of revolutions of the rotor 31, it is possible to always achieve compatibility between fine sealing property and low friction, and it is possible to prevent the occurrence of abnormal friction and friction loss, which result from excessive contact pressure caused by centrifugal force of the vane body 43 between the vane 42 and the rotor chamber 14. Further, it is possible to minimize the occurrence of leakage of vapor from a gap of the vane 42 and the rotor chamber 14.

Moreover, the rotation axis line L of the rotor 31 (that is, the rotation axis line L of the output shaft 23) conforms to the center of the rotor chamber 14, and when the rotor 31 is divided into four longitudinally and laterally by 90° in FIGS. 17 and 18, pressure energy is converted to mechanical energy on the upper right quadrant and the lower left quadrant, which are point symmetric with respect to the rotation axis line L. Thus, it is possible to prevent unbalanced load from being applied to the rotor 31, thereby suppressing the occurrence of vibration.

Namely, the rotating fluid machine comprises at least the first energy conversion means and the second energy conversion means, inputs working fluid having pressure energy to the first and second energy conversion means to convert the pressure energy to mechanical energy, so that the rotating fluid machine can function as an expander for combining mechanical energy generated by the first and second conversion means and outputting the energy, and besides, the rotating fluid machine inputs mechanical energy to the first and second energy conversion means to convert the mechanical energy to pressure energy of working fluid, so that the rotating fluid machine can function as a compressor for combining pressure energy of the working fluid that is generated by the first and second energy conversion means and outputting the energy. The first energy conversion means is formed by the cylinders which are formed radially on the rotor rotatably stored in the rotor chamber, and the pistons which slide in the cylinders. The second energy conversion means is formed by the vanes which appear in a radial direction from the rotor and have the outer peripheral surfaces sliding on the inner peripheral surface of the rotor chamber. In the above rotating fluid machine, at least the rollers operating in synchronization with the pistons are provided, and the roller are engaged to the noncircular ring groove formed on the casing for dividing the rotor chambers, so that the reciprocating motion of the pistons and the rotational motion of the rotor are converted to each other.

According to the above described sixth arrangement, the rollers are provided which rotate in the rotor chamber and are operated in synchronization with the pistons moving at least in a radial direction of the rotor, and the rotors are engaged into the noncircular ring groove formed on the casing for dividing the rotor chamber. Thus, with a simple configuration formed by the rollers and the ring groove, in the case of the function as an expander, reciprocating motion of the pistons can be converted to rotation motion of the rotor, and in the case of the function of a compressor, rotation motion of the rotor can be converted to reciprocating motion of the pistons.

Further, the rotating fluid machine comprises at least the first energy conversion means and the second energy conversion means, and inputs working fluid having pressure energy to the first and second energy conversion means to convert the pressure energy to mechanical energy, so that the rotating fluid machine can function as an expander for combining mechanical energy generated by the first and second energy conversion means and outputting the energy, and besides, the rotating fluid machine inputs mechanical energy to the first and second energy conversion means to convert the mechanical energy to pressure energy of working fluid, so that the rotating fluid machine can function as a compressors for combining pressure energy of working fluid that is generated by the first and second energy conversion means and outputting the energy. The first energy conversion means is formed by the cylinders which are formed radially on the rotor rotatably stored in the rotor chamber, and the pistons which slide in the cylinders. The second energy conversion means is formed by the vanes which appear in a radial direction from the rotor and have the outer peripheral surfaces sliding on the inner peripheral surface of the rotor chamber. In the above rotating fluid machine, at least the rollers are provided which are operated in synchronization with the vanes, and the rollers are engaged to the noncircular ring groove formed in the casing for dividing the rotor chamber so as to regulate a gap between the outer peripheral surface of the vane and the inner peripheral surface of the rotor chamber.

According to the above described seventh arrangement, the rollers are provided which rotate in the rotor chamber and move at least in a radial direction relative to the rotor and operate in synchronization with the vane, and the rollers are engaged to the noncircular ring groove formed on the casing for dividing the rotor chamber. Thus, by guiding the traveling track of the rollers with the ring groove it is possible to regulate a gap between the outer peripheral surface of the vane and the inner peripheral surface of the rotor chamber so as to prevent the occurrence of abnormal abrasion and the occurrence of leakage.

Also, the rotating fluid machine comprises at least the first energy conversion means and the second energy conversion means, inputs working fluid having pressure energy to the first and second energy conversion means to convert the pressure energy to mechanical energy, so that the rotating fluid machine can function as an expander for combining mechanical energy generated by the first and second energy conversion means and outputting the energy, and besides, the rotating fluid machine inputs mechanical energy to the first and second energy conversion means to convert the mechanical energy to pressure energy of working fluid, so that the rotating fluid machine can function as a compressor for combining generated pressure energy of working fluid that is generated by the first and second energy conversion means and outputting the energy. The first energy conversion means is formed by the cylinders which are formed radially on the rotor rotatably stored in the rotor chamber, and the pistons which slide in the cylinders, and the second energy conversion means is formed by the vanes which appear in a radial direction from the rotor and have the outer peripheral surfaces sliding on the inner peripheral surface of the rotor chamber. In the above rotating fluid machine, the rollers are provided which are operated in synchronization with the vanes and the pistons, and the rollers are engaged to the noncircular ring groove formed on the casing for dividing the rotor chamber, so that the reciprocating motion of the pistons and the rotation motion of the rotor can be converted to each other, and the a gap between the outer peripheral surface of the vane and the inner peripheral surface of the rotor chamber is regulated.

According to the above described eighth arrangement, the vanes are provided which rotate in the rotor chamber and move at least in a radial direction relative to the rotor, and the rollers operating in synchronization with the pistons, and the rollers are engaged to the noncircular ring groove formed on the casing for dividing the rotor chamber. Thus, with a simple configuration formed by the rollers and the ring groove, in the case of the function as an expander, the reciprocating motion of the pistons can be converted to the rotation motion of the rotor, and in the case of the function as a compressor, the rotation motion of the rotor can be converted to the reciprocating motion of the pistons. Additionally, the traveling track of the roller is guided by the ring groove, so that a gap between the outer peripheral surface of the vane and the inner peripheral surface of the rotor chamber can be regulated to prevent the occurrence of abnormal abrasion and the occurrence of leakage.

Moreover, in addition to any of the sixth to eighth arrangements, the rotation shaft of the rotor conforms to the center of the rotor chamber.

According to the above described ninth arrangement, since the rotation shaft of the rotor conforms to the center of the rotor chamber, it is possible to prevent unbalanced load from being applied to the rotor so as to prevent vibration caused by the rotation of the rotor.

It should be noted here that, as to high-temperature high-pressure vapor supplied to the vane-type rotating machine, which functions as an expander, a temperature and a pressure are reduced as pressure energy (thermal energy) is converted to mechanical energy by the vanes. Meanwhile, in the vane-type rotating machine which functions as a compressor, working fluid, which is compressed by the vanes driven by mechanical energy, gradually increases in temperature and pressure.

Therefore, in the case where a plurality of rotating machines are placed inside and outside in a radius direction, when low-pressure working fluid is supplied to the inner rotating machine and high-pressure working fluid is supplied to the outer rotating machine, a pressure of the working fluid is consumed needlessly because the high-pressure working fluid is more likely to leak to the outside of the casing. Further, in the case where a plurality of rotating machines are placed inside and outside in a radius direction, when low-temperature working fluid is supplied to the inner rotating machine, and the high-temperature working fluid is supplied to the outer rotating machine, thermal efficiency is reduced because heat of the working fluid is likely to leak to the outside of the casing.

Therefore, in the rotating fluid machine having at least the first energy conversion means and the second energy conversion means placed inside and outside in a radius direction, it is desirable to minimize leakage of heat and pressure of working fluid to improve efficiency of the rotating fluid machine.

Thus, in the above described expander 4, the first energy conversion means formed by the cylinder members 39 and the pistons 41 is placed at the center of the rotor chamber 14, and the second energy conversion means formed by the vanes 42 is placed outside in a radius direction so as to surround the first energy conversion means. Therefore, high-temperature high-pressure vapor is initially supplied to the first energy conversion means (cylinders 39 and pistons 41) at the center, and the first low-temperature low-pressure vapor, which has been converted to mechanical energy in the first energy conversion means, is supplied to the second energy conversion means (vanes 42) on the outer peripheral surface. In this way, when the first and second energy conversion means are placed inside and outside in a radius direction, high-temperature high-pressure vapor is supplied to the inner first energy conversion means, and low-temperature low-pressure vapor is supplied to the outside second energy conversion means, so that pressure and heat of high-temperature high-pressure vapor leaked from the inner first energy conversion means can be captured and recovered by the outer second energy conversion means, and leaked high-temperature high-pressure vapor can be used without wasting the vapor to improve overall efficiency of the expander 4. Additionally, the second energy conversion means, which supplies the first low-temperature low-pressure vapor with a relatively low pressure and temperature, is placed on the outer peripheral surface of the rotor chamber 14. Hence, sealing can be readily made to prevent leakage of working fluid to the outside from the rotor chamber 14. Additionally, thermal insulation can be also readily made to prevent leakage of heat to the outside from the rotor chamber 14.

Besides, when the rotating fluid machine of the present invention is used as a compressor, compressed air, which is compressed by first-state compression of the vanes 42 serving as the outer second energy conversion means, increases in pressure and temperature, and the compressed air further increases in pressure and temperature by second-stage compression of the cylinder means 39 and the pistons 41 that serve as the inner first energy conversion means. Therefore, even when the rotating fluid machine is used as a compressor, it is possible to cause the outer second energy conversion means to capture and recover pressure and heat of high-temperature high-pressure compressed air leaked from the inner first energy conversion means so as to improve overall efficiency of the compressor. Additionally, sealing can be readily made to prevent leakage of compressed air to the outside from the rotor chamber 14, and thermal insulation can be also readily made to prevent leakage of heat to the outside from the rotor chamber 14.

Namely, the rotating fluid machine comprises at least the first energy conversion means and the second energy conversion means, and inputs working fluid having pressure energy to the first and second energy conversion means to convert the pressure energy to mechanical energy, so that the rotating fluid machine can function as an expander for combining mechanical energy generated by the first and second energy conversion means and outputting the energy, and besides, the rotating fluid machine inputs mechanical energy to the first and second energy conversion means to convert the mechanical energy to pressure energy of working fluid, so that the rotating fluid machine can function as a compressor for combining pressure energy of the working fluid that is generated by the first and second energy conversion means and outputting the energy. In the above rotating fluid machine, high-pressure working fluid is placed at the center of the rotor chamber for rotatably storing the rotor having the first and the second energy conversion means, and low-pressure working fluid is placed on the outer circumference of the rotor chamber.

According to the above described tenth arrangement, high-pressure working fluid and low-pressure working fluid are respectively placed at the center and the outer circumference of the rotor chamber, which rotatably stores the rotor. Hence, high-pressure working fluid leaked from the center of the rotor chamber is captured and recovered by low-pressure working fluid on the outer circumference of the rotor chamber, the leaked high-pressure working fluid can be used without wasting the fluid to improve overall efficiency of the rotating fluid machine, and sealing can be readily made to prevent leakage of working fluid to the outside from the rotor chamber.

Further, the rotating fluid machine comprises at least the first energy conversion means and the second energy conversion means, and inputs working fluid having pressure energy to the first and second energy conversion means to convert the pressure energy to mechanical energy, so that the rotating fluid machine can function as an expander for combining mechanical energy generated by the first and second energy conversion means and outputting the energy, and besides, the rotating fluid machine inputs mechanical energy to the first and second energy conversion means to convert the mechanical energy to pressure energy of working fluid, so that the rotating fluid machine can function as a compressor for combining pressure energy of working fluid that is generated by the first and second energy conversion means and outputting the energy. In the above rotating fluid machine, high-temperature working fluid is placed at the center of the rotor chamber for rotatably storing the rotor having the first and second energy conversion means, and low-temperature working fluid is placed on the outer circumference of the rotor chamber.

According to the eleventh arrangement, high-temperature working fluid and low-temperature working fluid are respectively placed at the center and the outer circumference of the rotor chamber for rotatably storing the rotor. Hence, high-temperature working fluid leaked from the center of the rotor chamber is captured and recovered by low-temperature working fluid on the outer circumference of the rotor chamber, the leaked high-temperature working fluid can be used without waste to improve overall efficiency of the rotating fluid machine, and thermal insulation can be readily made to prevent leakage of heat to the outside from the rotor chamber.

Moreover, the rotating fluid machine comprises at least the first energy conversion means and the second energy conversion means, and inputs working fluid having pressure energy to the first and second energy conversion means to convert the pressure energy to mechanical energy, so that the rotating fluid machine can function as an expander for combining mechanical energy generated by the first and second energy conversion means and outputting the energy, and besides, the rotating fluid machine inputs mechanical energy to the first and second energy conversion means to convert the mechanical energy to pressure energy of working fluid, so that the rotating fluid machine can function as a compressor for combining pressure energy of working fluid that is generated by the first and second energy conversion means and outputting the energy. In the above rotating fluid machine, high-pressure and high-temperature working fluid is placed at the center of the rotor chamber for rotatably storing the rotor having the first and second energy conversion means, and low-temperature and low-pressure working fluid is placed on the outer circumference of the rotor chamber.

According to the twelfth arrangement, high-pressure and high-temperature working fluid and low-pressure and low-temperature working fluid are respectively placed at the center and the outer circumference of the rotor chamber for rotatably storing the rotor. Thus, high-pressure and high-temperature working fluid leaked from the center of the rotor chamber is captured and recovered by low-pressure and low-temperature working fluid on the outer circumference of the rotor chamber, and the leaked high-pressure and high-temperature working fluid can be used without waste to improve overall efficiency of the rotating fluid machine. Besides, since low-pressure low-temperature working fluid is placed on the outer circumference of the rotor chamber, sealing can be readily made to prevent leakage of working fluid to the rotor chamber to the outside, and heat insulation can be readily made to prevent leakage of heat to the outside from the rotor chamber.

Further, in addition to any of the tenth to twelfth arrangements, the first energy conversion means is formed by the cylinders which are formed radially on the rotor rotatably stored in the rotor chamber, and the pistons which slide in the cylinder, and the second energy conversion means is formed by the vanes which appear in a radial direction from the rotor and have the outer peripheral surfaces sliding on the inner peripheral surface of the rotor chamber.

According to the thirteenth arrangement, the first energy conversion means is formed by the cylinders which are radially formed on the rotor rotatably stored in the rotor chamber, and the pistons which slide in the cylinders. Thus, sealing property of high-pressure working fluid can be improved to minimize a reduction in efficiency that is caused by leakage, and the second energy conversion means is formed by the vanes which is supported by the rotor so as to freely move in a radial direction and slide on the inner peripheral surface of the rotor chamber. Hence, the mechanism for converting pressure energy and mechanical energy can be simplified, and a large quantity of working fluid can be processed with a compact configuration. In this way, with the combination of the first energy conversion means having the pistons and the cylinders and the second energy conversion means having the vanes, it is possible to obtain a high-performance rotating fluid machine achieving compatibility of both of the means.

Incidentally, Japanese Patent Application Laid-open No. 58-48076 discloses that a simple vane motor is used as an expander. Thus, it is difficult to efficiently convert energy of high-temperature high-pressure vapor generated by the evaporator to mechanical energy.

Therefore, it is desirable to improve efficiency of the expander of the Rankine cycle device to efficiently convert energy of high-temperature high-pressure vapor to mechanical energy.

Hence, in the Rankine cycle formed by the evaporator 3 for heating water with thermal energy of exhaust gas by the internal combustion engine 1 to generate high-temperature high-pressure vapor, the expander 4 for converting high-temperature high-pressure vapor to shaft output with constant torque, the condenser 5 for liquefying low-temperature low-pressure vapor discharged by the expander 4, and the feed pump 6 for supplying water liquefied by the condenser 5 to the evaporator 3, the above described example adopts a displacement-type machine as the expander 4. The displacement-type expander 4 can recover energy with high efficiency in a wide region of the number of revolutions from low speed to high speed, and the expander 4 is further excellent in tracking and response for variations in thermal energy (variations in temperature and quantity of exhaust gas), the variations being caused by an increase and decrease in the number of revolutions of the internal combustion engine 1. Furthermore, the expander 4 is a double expansion type, in which the first energy conversion means formed by the cylinder members 39 and the pistons 41 and the second energy conversion means formed by the vanes 42 are connected in series and are placed inside and outside in a radius direction. Hence, it is possible to further improve efficiency of recovering thermal energy by using a Rankine cycle while the expander 4 is reduced in weight and size to improve space efficiency.

Namely, the rotating fluid machine is provided in the Rankine cycle device which converts pressure energy of high-temperature high-pressure vapor to mechanical energy, the high-temperature high-pressure being generated by heating water with waste heat of the prime mover, which condenses low-temperature low-pressure vapor generated thus and heat the vapor with the above waste heat again, and which is comprised of the displacement-type expander for converting pressure energy to mechanical energy. In the above rotating fluid machine, the expander comprises at least the first energy conversion means and the second energy conversion means, and the pressure energy is input to the first and second energy conversion means to be converted to mechanical energy, so that mechanical energies generated by the first and second energy conversion means are combined and output.

According to the above fourteenth arrangement, the Rankine cycle device which converts pressure energy of high-temperature high-pressure vapor to mechanical energy, the high-temperature high-pressure vapor being generated by heating water with waste heat of the prime mover, and which liquefies low-temperature low-pressure vapor generated thus and heats the vapor with the above waste heat again. In such a Rankine cycle device, the expander for converting pressure energy to mechanical energy is a displacement-type. Thus, as compared with an expander of a non-displacement-type such as a turbine, it is possible to recover energy with high efficiency in a wide region of the number of revolutions from low speed to high speed and to further improve efficiency of recovering thermal energy by using a Rankine cycle. Furthermore, the expander is excellent in tracking and response to variations in energy of waste heat, the variations being caused by an increase and decrease in the number of revolutions of the prime mover. Moreover, the displacement-type expander combines the output of the first energy conversion means and the output of the second energy conversion means and outputs the combined outputs. Thus, it is possible to convert pressure energy of high-temperature high-pressure vapor to mechanical energy without wasting the energy, and it is also possible to reduce the expander in weight and size to improve space efficiency.

Moreover, in addition to the above fourteenth arrangement, the first energy conversion means is formed by the cylinders which are radially formed on the rotor rotatably stored in the rotor chamber, and the pistons which slide in the cylinders, and the second energy conversion means is formed by the vane which appear radially from the rotor and have the outer circumference surfaces sliding on the inner peripheral surface of the rotor chamber.

According to the above fifteenth arrangement, the first energy conversion means is formed by the cylinders which are formed radially on the rotor rotatably stored in the rotor chamber, and the pistons which slide in the cylinders. Hence, it is possible to improve the sealing property of high-pressure vapor to minimize a reduction in efficiency that is caused by leakage. Besides, the second energy conversion means is formed by the vanes which are movably supported in a radial direction on the rotor and slide on the inner peripheral surface of the rotor chamber. Thus, the configuration of the mechanism for converting pressure energy and mechanical energy is simplified and a large flow rate of vapor can be processed with a compact configuration. In this way, the first energy conversion means having the pistons and the cylinders and the second energy conversion means having the vanes are combined, so that a high-performance rotating fluid machine can be obtained with the characteristics of both of the means.

Also, in addition to the above fifteenth arrangement, the rollers are provided which are operated in synchronization with the vanes and the pistons, and the rollers are engaged to the noncircular ring groove formed on the casing for dividing the rotor chamber, so that the reciprocating motion of the pistons and the rotation motion of the rotor are converted to each other, and a gap is regulated between the outer peripheral surface of the vane and the inner peripheral surface of the rotor chamber.

According to the above sixteenth arrangement, the rollers are provided which are operated in synchronization with the vanes and the pistons. The vanes and the pistons move in a radial direction at least relative to the rotor, which rotates in the rotor chamber. The rollers are engaged to the noncircular ring groove formed on the casing for dividing the rotor chamber. Thus, with a simple configuration including the rollers and the ring groove, the reciprocating motion of the pistons can be converted to the rotational motion of the rotor, and the traveling track of the roller is guided by the ring groove, so that it is possible to regulate a gap between the outer peripheral surface of the vane and the inner peripheral surface of the rotor chamber to prevent the occurrence of normal abrasion and the occurrence of leakage.

Further, in addition to the above fourteenth arrangement, high-temperature high-pressure vapor is placed at the center of the rotor chamber for rotatably storing the rotor, which comprises the first and second energy conversion means, and low-temperature low-pressure vapor is placed on the outer peripheral surface of the rotor chamber.

According to the above seventeenth arrangement, high-temperature high-pressure vapor and low-temperature low pressure vapor are placed at the center and the outer circumference of the rotor chamber for rotatably storing the rotor. Hence, high-temperature high-pressure vapor leaked from the center of the rotor chamber is captured and recovered by low-temperature low-pressure vapor on the outer circumference of the rotor chamber, and the leaked high-temperature high-pressure vapor can be used without wasting the vapor to improve overall efficiency of the rotating fluid machine. In addition, since low-temperature low-pressure vapor is placed on the outer circumference of the rotor chamber, sealing can be readily made to prevent leakage of vapor from the rotor chamber to the outside, and thermal insulation can be readily made to prevent leakage of heat from the rotor chamber to the outside.

Further, in addition to the above seventeenth arrangement, the first energy conversion means is formed by the cylinders which are formed radially on the rotor rotatably stored in the rotor chamber, and the pistons which slide in the cylinders, and the second energy conversion means is formed by the vanes which appear radially from the rotor and have outer peripheral surfaces sliding on the inner peripheral surface of the rotor chamber.

According to the above eighteenth arrangement, the first energy conversion means is formed by the cylinders which are formed radially on the rotor rotatably stored in the rotor chamber, and the pistons which slide in the cylinders. Hence, it is possible to improve the sealing property of high-pressure vapor to minimize a reduction in efficiency that is caused by leakage. Further, the second energy conversion means is formed by the vanes which are movably supported on the rotor in a radial direction and slide on the inner peripheral surface of the rotor chamber. Thus, the configuration of the mechanism for converting pressure energy and mechanical energy is simplified, and a large flow rate of vapor can be processed with a compact configuration. In this way, with the combination of the first energy conversion means having the pistons and the cylinders and the second energy conversion means having the vanes, a high-performance rotating fluid machine can be obtained with the characteristics of both of the means.

Although the embodiment of the present invention has been described in detail, it will be understood that the present invention is not limited to the above-described embodiment, and various modifications in design may be made without departing from the subject matter of the invention defined in the claims.

For example, in the above embodiment, water is shown as an example of working medium. A working medium other than water is also applicable.

Moreover, in the above embodiment, the drive system for driving an automobile is shown as an example. Like auxiliary machinery including a pump and fan, the present invention can be applied to a drive system used for the other arbitrary purposes.

Further, in the above embodiment, the power generator/motor 124 and the transmission 143 are shown as examples of a portion driven by the expander 4.

Besides, in the expander 4 of the above embodiment, after high-temperature high-pressure vapor is initially supplied to the cylinder members 39 and the pistons 41 that serve as the first energy conversion means, the first low-temperature low-pressure vapor reduced in temperature and pressure is supplied to the vanes 42 serving as the second energy conversion means. For example, the following configuration is also applicable: connection or disconnection is made between the through-hole t, which discharges the first low-temperature low-pressure vapor from the first energy conversion means shown in FIG. 15, and the relay chamber 20, and means is provided for supplying vapor separately to the relay chamber 20 via the shell-shaped member 16 separately from the second energy conversion means, so that vapor is separately supplied to the first and second energy conversion means with different temperatures and pressures.

Further, vapor may be separately supplied to the first and second energy conversion means with different temperatures and pressures, and vapor reduced in temperature and pressure after passage through the first energy conversion means may be additionally supplied to the second energy conversion means.

Moreover, in the above embodiment, the rollers 59 are provided on the vane main bodies 43 of the vane piston units U1 to U12. The rollers 59 may be provided on parts other than the vane piston units U1 to U12, for example, on the piston 41.

INDUSTRIAL APPLICABILITY

As described above, the drive system according to the present invention can be suitably used as a driving source of an automobile but is also applicable to a driving source of auxiliary machinery of an automobile that includes a pump and fan. Further, it is also applicable to a drive system used for an arbitrary purpose other than an automobile.

What is claimed is:

1. A drive system comprising:
   a waste heat recovering device forming a Rankine cycle by an evaporator for heating a working medium with waste heat of a prime mover to generate high-pressure vapor, a displacement-type expander for converting high-pressure vapor generated by the evaporator to output with a constant torque, a condenser for liquefying low-pressure vapor discharged from the expander, and a pump for supplying the working medium liquefied by the condenser to the evaporator; and a power transmission system having a variable change gear ratio and capable of conducting a speed change operation for transmitting an output of the expander to a driven portion, said power transmission system driving the driven portion according to output characteristics of the expander.

2. The drive system according to claim 1, wherein said power transmission system drives the driven portion within a range of the output characteristics of the expander.

3. The drive system according to claim 1, wherein said power transmission system can distribute the output of the expander to a plurality of driven portions in an arbitrary ratio.

4. The drive system according to claim 3, wherein the plurality of drive portions includes a power generator and a transmission.

5. A drive system according to claim 1, wherein said power transmission system comprises at least a planetary gear mechanism.

6. The drive system according to claim 5, wherein the planetary gear mechanism includes a sun gear, a ring gear, and a planetary carrier, and by fixing one of the sun gear, the ring gear, and the planetary carrier, transmission of driving force can be switched among the expander and a plurality of driven portions.

* * * * *